(12) United States Patent
Inakoshi et al.

(10) Patent No.: US 9,175,965 B2
(45) Date of Patent: Nov. 3, 2015

(54) APPARATUS AND METHOD FOR COORDINATE CODING, AND METHOD AND APPARATUS FOR DISTANCE CALCULATION

(75) Inventors: Hiroya Inakoshi, Tama (JP); Tatsuya Asai, Kawasaki (JP); Hiroaki Morikawa, Kawasaki (JP); Shinichiro Tago, Shinagawa (JP); Nobuhiro Yugami, Minato (JP); Seishi Okamoto, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 13/541,376

(22) Filed: Jul. 3, 2012

(65) Prior Publication Data
US 2013/0013661 A1 Jan. 10, 2013

(30) Foreign Application Priority Data

Jul. 7, 2011 (JP) ................. 2011-151172

(51) Int. Cl.
*G06F 7/00* (2006.01)
*G01C 21/20* (2006.01)
(52) U.S. Cl.
CPC ..................... *G01C 21/20* (2013.01)
(58) Field of Classification Search
None
See application file for complete search history.

(56) References Cited

U.S. PATENT DOCUMENTS

| | | | |
|---|---|---|---|
| 6,252,993 B1 * | 6/2001 | Murayama | 382/242 |
| 7,302,343 B2 | 11/2007 | Beatty | |
| 2004/0111214 A1 * | 6/2004 | Buecher et al. | 701/209 |
| 2010/0289675 A1 | 11/2010 | Ueda | |
| 2011/0055300 A1 * | 3/2011 | Sun et al. | 708/200 |
| 2013/0013661 A1 * | 1/2013 | Inakoshi et al. | 708/442 |
| 2013/0064294 A1 * | 3/2013 | Sole Rojals et al. | 375/240.12 |
| 2013/0301950 A1 * | 11/2013 | Vigliar et al. | 382/260 |

FOREIGN PATENT DOCUMENTS

| | | |
|---|---|---|
| JP | 2003-203243 A | 7/2003 |
| JP | 2007-41189 A | 2/2007 |

OTHER PUBLICATIONS

Japanese Office Action mailed on Nov. 18, 2014 for corresponding Japanese Patent Application No. 2011-151172, with Partial English Translation, 3 pages.

* cited by examiner

*Primary Examiner* — David H Malzahn
(74) *Attorney, Agent, or Firm* — Fujitsu Patent Center

(57) ABSTRACT

An apparatus includes a unit dividing a region into blocks having a predetermined bit length and generating addition data having the predetermined bit length corresponding to coordinate data, a unit storing storage data having the predetermined bit length, a unit generating composite data having a bit length twice the length of the predetermined bit length by connecting the addition data to the storage data, and storing the composite data, and a unit repeating an operation of designating the bit length of the composite data as the predetermined bit length, instructing to generate the addition data, and instructing to generate and store the composite data. The number of different bits between a bit string of a location corresponding to the input coordinate data and a bit string of a reference location tends to increase as a distance between the location corresponding to the coordinate data and the reference location increases.

20 Claims, 21 Drawing Sheets

FIG.2

| LONGITUDE BIT STRING | 0 | 1 | 1 | 1 | 1 | 1 | 1 | 1 | ... |
| --- | --- | --- | --- | --- | --- | --- | --- | --- | --- |
| LATITUDE BIT STRING | | 1 | 1 | 0 | 1 | 1 | 1 | 1 | ... |
| COMPOSITE BIT STRING | 0 | 1 | 1 | 0 | 1 | 1 | 1 | 1 | ... |

FIG.3

| DECIMAL NUMERAL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| base32 | 0 | 1 | 2 | 3 | 4 | 5 | 6 | 7 | 8 | 9 | b | c | d | e | f | g |

| 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| h | j | k | m | n | p | q | r | s | t | u | v | w | x | y | z |

FIG.12

| 0* 0* | 0* 0* | 1* 0* | 1* 0* |
|---|---|---|---|
| 0* 0* | 0* 0* | 1* 0* | 1* 0* |
| 0* 1* | 0* 1* | 1* 1* | 1* 1* |
| 0* 1* | 0* 1* | 1* 1* | 1* 1* |

| 1 1 | 0 1 | 0 1 | 1 1 |
|---|---|---|---|
| 1 0 | 0 0 | 0 0 | 1 0 |
| 1 0 | 0 0 | 0 0 | 1 0 |
| 1 1 | 0 1 | 0 1 | 1 1 |

~38#4

$s_x = \{x1, x2, \cdots xn\}$
$s_y = \{y1, y2, \cdots yn\}$ $s = \{x1, y1, x2, y2 \cdots xn, yn\}$

APPARATUS AND METHOD FOR COORDINATE CODING, AND METHOD AND APPARATUS FOR DISTANCE CALCULATION

CROSS-REFERENCE TO RELATED APPLICATIONS

This application is based upon and claims the benefit of priority of the prior Japanese Patent Application No. 2011-151172 filed on Jul. 7, 2011, the entire contents of which are incorporated herein by reference.

FIELD

The embodiments discussed herein are related to an apparatus, a method, and a recording medium for coordinate coding, such as converting coordinate data into a code expressed by text data. Further, the embodiments discussed herein are related to an apparatus, a method, and a recording medium for distance calculation, such as obtaining coordinate data of two points and calculating the distance between the two points.

BACKGROUND

Conventionally, a technology referred to as geohashing is known as a technology for converting coordinate data into codes (text data). First, in performing geohashing, values indicating latitude and longitude are input. Then, bit strings corresponding to the input values of latitude and longitude are obtained. Then, 1 bit is extracted from a bit string corresponding to longitude and 1 bit is extracted from a bit string corresponding to latitude, alternately. Then, by alternately combining the bits extracted from the bit strings corresponding to longitude and latitude, a composite bit string is obtained. Then, codes are derived by applying a predetermined table to the composite bit string. The geohash technology is suitably used for, for example, computer processing or storing location point information in a database by allocating the derived codes to location points.

Next, an example of a process performed in each stage of a geohash operation is described. Bit strings are obtained from latitude and longitude by using the following method. It is to be noted that, in the following, parentheses "(" and ")" represent an open section which indicate that a value is not included, and brackets "[" and "]" represent a closed section which indicate that a value is included. In this example, it is a premise that the input value of latitude assumes a value of [−90 to 90], and the input value of longitude assumes a value of [−180 to 180). Accordingly, in this example, the range of the input value of latitude includes −180 but does not include 180. In the following, in a case where a section is subdivided into upper and lower sections, it is assumed that the upper section is the open section, so that a median value can be located within either one of the sections.

For example, in a case where the input value of latitude is located on the right side with respect to a medium value of 0 in a section of [−90 to 90] (i.e. located in a section [0 to 90]), 1 is input as the highest bit to a storage device. In a case where the input value of latitude is located on the left side with respect to the medium value in the section of [−90 to 90] (i.e. located in a section [−90 to 0)), 0 is input as the highest bit to the storage device. Then, in the case where the input value of latitude is located on the right side with respect to the medium value of 0, the section of the right side (i.e. section [0 to 90]) is further subdivided. Accordingly, in a case where the input value of latitude is located on the right side with respect to a medium value of 45 in the section [0 to 90] (i.e. located in section [45 to 90]), 1 is input as the second bit to the storage device. In the case where the input value of latitude is located on the left side with respect to a medium value of 45, 0 is input as the second bit to the storage device. These processes are repeated until a sufficient accuracy can be attained.

FIG. 1 is a schematic diagram for describing an example of generating a bit string pertaining to latitude (hereinafter also referred to as "latitude bit string") by using geohash technology. In the example of FIG. 1, it is assumed that the input value of latitude is 42.6. In determining the location of the input value with respect to the median value for the first time, 1 is input to the storage device because the input value is located on the right side of the median value of 0 in the section of [−90 to 90] as illustrated in FIG. 1. In determining the location of the input value with respect to the median value for the second time, 0 is input to the storage device because the input value is located on the left side of the median value of 45 in the section of [0 to 90]. Likewise, in determining the location of the input value with respect to the median value for the third time, 1 is input to the storage device because the input value is located on the right side of the median value of 22.5 in the section of [0 to 45]. In determining the location of the input value with respect to the median value for the fourth time, 1 is input to the storage device because the input value is located on the right side of the median value of 33.75 in the section of [22.5 to 45]. In determining the location of the input value with respect to the median value for the fifth time, 1 is input to the storage device because the input value is located on the right side of the median value of 39.38 in the section of [33.75 to 45]. By recursively dividing the sections (i.e. repeating subdivision of sections), a latitude bit string of "10111" is obtained.

Similarly, in a case where the input value of longitude is −5.6, a bit string pertaining to longitude (hereinafter also referred to as "longitude bit string") of "01111" is obtained.

After obtaining the latitude bit string and the longitude bit string, a composite bit string is generated by alternately arranging the bits of the latitude bit string and the bits of the longitude bit string one after another.

In this example, the bits of the latitude bit string and the bits of the longitude bit string are stored in an order starting from the highest bit of the longitude bit string "0" and followed by the highest bit of the latitude bit string "1", the second highest bit of the longitude bit string "1", the second highest bit of the latitude bit string "0", the third highest bit of the longitude bit string "1", . . . the sixth highest bit of the longitude bit string "1". As a result, a composite bit string in this example is "0110111111". FIG. 2 is a schematic diagram illustrating an example of obtaining a composite bit string obtained by combining a longitude bit string and a latitude bit string.

After obtaining a composite bit string, the composite bit string is converted into text data (codes) by using a conversion method such as base 32. FIG. 3 is a schematic diagram illustrating a base 32 conversion table. With base 32, a bit value equivalent to 5 bits is associated to a numeral or an alphabet letter as illustrated in FIG. 3. With the above-described composite bit string "0110111111", "01101" corresponds to "e" and "11111" corresponds to "z". Accordingly, the composite bit string "0110111111" is converted into code "ez". The Geohash code can be expressed having a given accuracy. Geohash code has a characteristic in which its accuracy increases as the length of the Geohash code becomes longer and a characteristic in which its accuracy gradually decreases the more a tail end part of the Geohash code is omitted from the Geohash code.

For example, a code "u4pruydqqvj" can be derived from a set of coordinates {latitude: 57.64911, longitude: 10.40744}.

In the current Internet, there is an available service that allows a corresponding location point of a map to be displayed by accessing a URL having a code added after "http://geohash.org/". By converting latitude coordinates and longitude coordinates into codes, the length of data can be shortened. Thereby, transmission/reception of data or storage of data can be easily performed.

In order to obtain coordinates from a code, a process can be performed backwards relative to the process described with FIG. 1. For example, first, data "0110111111" is obtained by performing inverse transformation on the above-described code "ez". Then, by reading the obtained data bit-by-bit, "01111" is recognized as a latitude bit string and "10111" is recognized as a longitude bit string.

It is to be noted that there are also other technology besides geohashing that can convert coordinates into codes (see, for example, U.S. Publication No. 2005/0023524).

Although geohashing technology satisfies an aspect of uniqueness in which codes and bit strings correspond to coordinates on a one on one basis, geohashing technology has a problem of not satisfying an aspect of distance retention. The aspect of distance retention is a property in which points (codes) that are located nearby are always indicated with bit strings that are close (similar) to each other. Thus, to not satisfy distance retention indicates being unable to consistently retain a distance between two points regardless of how the distance pertaining to codes or bit strings allocated to two points is defined. In a case where a target region is divided into blocks in correspondence with the accuracy of the code, a map or a set of coordinates can be expressed by identifying the block to which the coordinates belong. Thus, the term "block distance" indicates by how many blocks two points are separated. With this kind of coding technology, a block can be regarded substantially as an equivalent of a set of coordinates.

FIG. 4 is a schematic diagram for describing a block distance RD where geohashing technology is used. FIG. 4 is also for describing that geohashing technology is unable to satisfy the aspect of distance retention. In the example illustrated in FIG. 4, a code is expressed having an accuracy of 3 bits in a longitude direction and 2 bits in the latitude direction. In order to perform inverse transformation, a composite bit string is expressed in two columns having an upper column to which longitude data is assigned and a lower column to which latitude data is assigned. For example, as illustrated in FIG. 4, the number of different bit values of corresponding composite bit strings assigned to each one of two blocks (indicated with Hamming distance (HD)) may not always match the block distance between the two blocks. Thus, as a result, a pseudo-distance of the codes between the two blocks (e.g., "1" in a case of r and s, "3" in a case of r and u) do not indicate the block distance RD. Particularly, in a case where geohashing technology is used on the earth's surface, it is known that the relationship between the Hamming distance HD and the block distance RD significantly changes at the vicinity of, for example, the equator, the prime meridian, and the date line.

Without the aspect of distance retention, a block distance cannot be immediately derived even if codes or composite bit strings of two points (equivalent to two blocks) are provided. As a result, it would become necessary to perform inverse calculation of coordinates by using the provided codes or composite bit strings and then calculate the distance by using another arithmetic expression. Such calculation increases workload and delays process time.

SUMMARY

According to an aspect of the invention, there is provided a coordinate coding apparatus including: a first unit that divides a target process region into blocks having a predetermined bit length and generates addition data having the predetermined bit length corresponding to input coordinate data; a second unit that stores storage data having the predetermined bit length; a third unit that generates composite bit string data having a bit length that is twice the length of the predetermined bit length by connecting the addition data to the storage data, and stores the composite bit string data in the second unit; and a control unit that repeats an operation of designating the bit length of the composite bit string data as the predetermined bit length, instructing the first unit to generate the addition data, and instructing the third unit to generate and store the composite bit string data; wherein the number of different bits between a bit string of a location corresponding to the input coordinate data and a bit string of a reference location has a tendency of increasing as a distance between the location corresponding to the input coordinate data and the reference location increases.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIG. 2 is a table for describing how a composite bit string is obtained from a latitude bit string and a longitude bit string;

FIG. 3 is a schematic diagram illustrating a base 32 conversion table;

FIG. 12 is a schematic diagram illustrating an example of a place holder grid expanded two times (in a case where the bit length is 4);

FIG. 13 is a schematic diagram illustrating an example of mask data (in a case where the bit length is 4);

DESCRIPTION OF EMBODIMENTS

First Embodiment

Next, a distance calculation apparatus 1, a method for calculating distance, and a program for calculating a distance according to the first embodiment of the present invention are described with reference to the drawings.

[Hardware Configuration]

Figure 5:
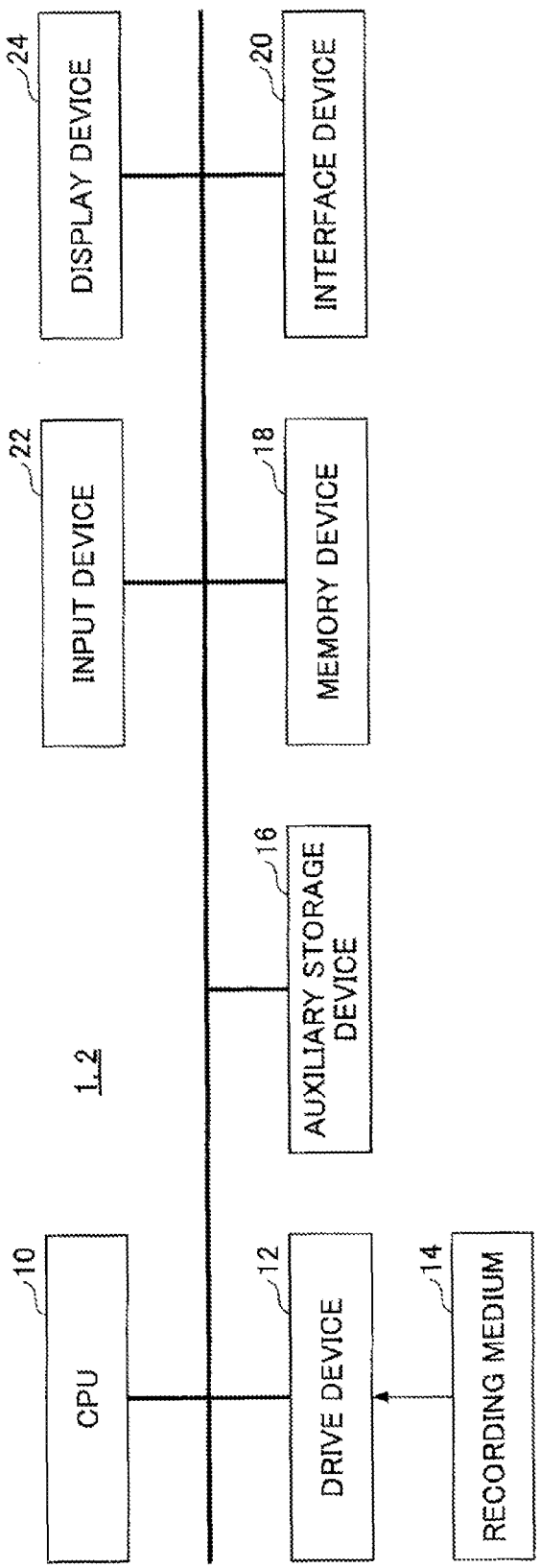
FIG. 5 is a schematic diagram illustrating a hardware configuration of a distance calculation apparatus according to a first embodiment of the present invention.

FIG. 5 is a schematic diagram illustrating a hardware configuration of a distance calculation apparatus 1 according to the first embodiment of the present invention. The distance calculation apparatus 1 may be, for example, a data process apparatus including a CPU (Central Processing Unit) 10, a drive device 12, an auxiliary storage device 16, a memory device 18, an interface device 20, an input device 22, and a display device 24. The parts and components constituting the distance calculation apparatus 1 are connected by, for example, a bus or a serial line.

The CPU 10 may be, for example, a processor including a program counter, an instruction decoder, various operators, a LSU (Load Store Unit), and a general purpose register.

The drive device 12 can read a program or data from a recording medium 14. When the recording medium 14 on which a program is recorded is mounted onto the drive device 12, the program is installed from the recording medium 14 to the auxiliary storage device 16 via the drive device 12. The recording medium 14 may be, for example, a portable type computer-readable recording medium such as a CD-ROM (Compact disc Read Only Memory), a DVD (Digital Versatile Disc) or a USB (Universal Serial Bus) memory. Further, the auxiliary storage device 16 may be, for example, a HDD (Hard Disk Drive) or a flash memory.

Other than installing the program from the recording medium 14, the program may be downloaded by the interface device 20 from another computer via a network and installed to the auxiliary storage device 16. The network may be, for example, the Internet, a LAN (Local Area Network), or a mobile telephone network. Further, the program may be preinstalled in the auxiliary storage device 16 or a ROM (Read Only Memory) at the time of, for example, shipping the data process apparatus (i.e. distance calculation apparatus) 1.

Figure 1:
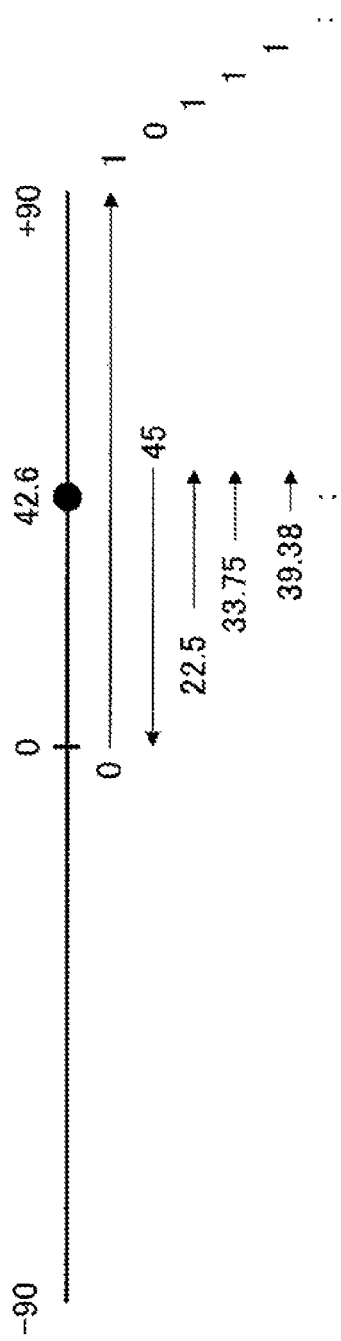
FIG. 1 is a schematic diagram illustrating how a bit string pertaining to latitude is generated by using geohashing technology.
Figure 4:
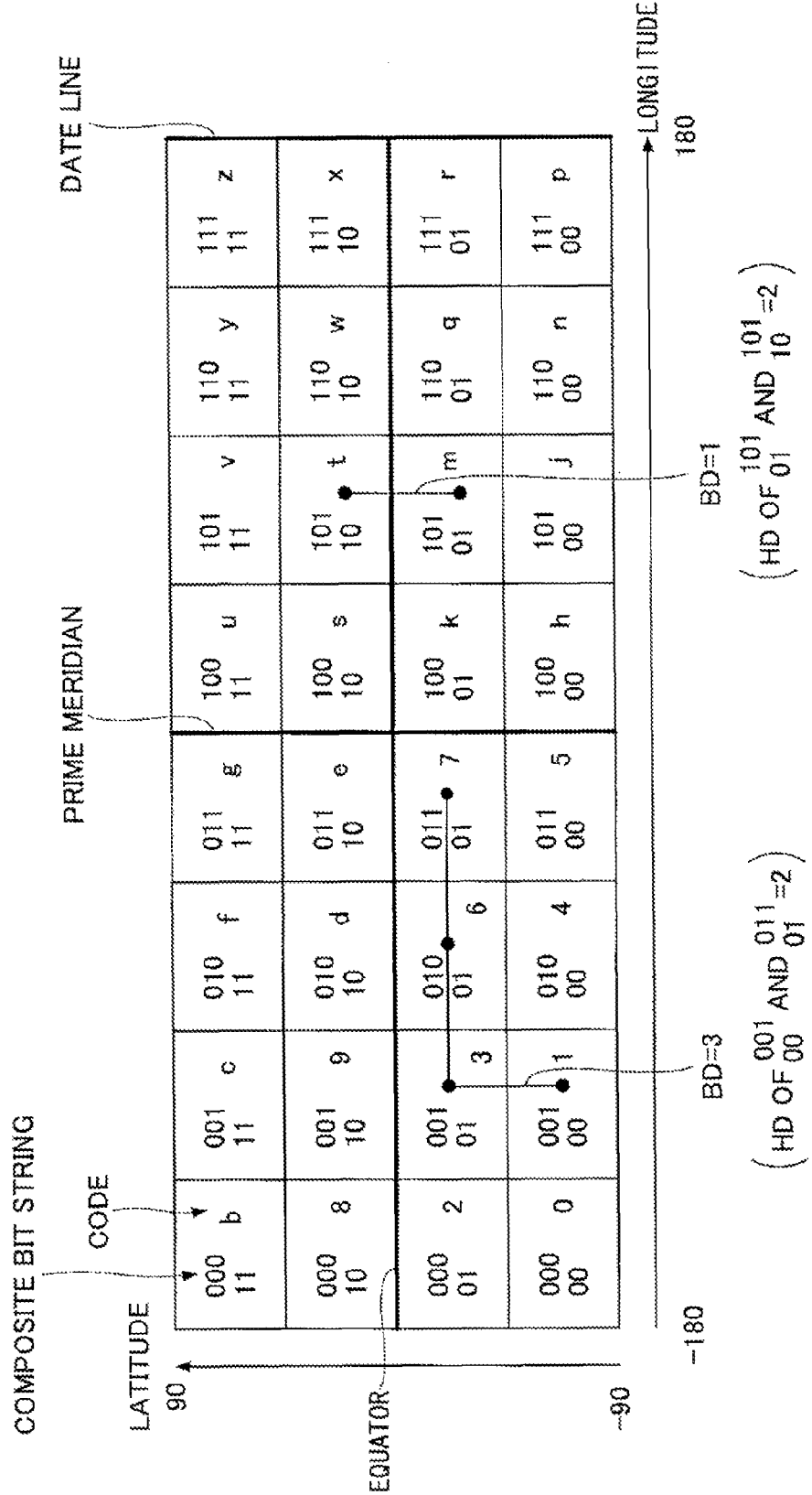
FIG. 4 is a schematic diagram for describing a block distance using geohashing technology is used and describing that distance retention cannot be attained by geohashing technology.

By executing the installed or preinstalled program with the CPU 10, the data process apparatus illustrated in FIG. 1 functions as the distance calculation apparatus 1 according to an embodiment of the present invention.

The memory device 18 may be, for example, a RAM (Random Access Memory) and an EEPROM (Electrically Erasable and Programmable Read Only Memory). The interface device 20 controls, for example, connection between the distance calculation apparatus 1 and the network.

The input device 22 may be, for example, a keyboard, a mouse, a touch pad, a touch panel, or a microphone. Further, the display device 24 may be, for example, a LCD (Liquid Crystal Display) or a CRT (Cathode Ray Tube). The distance calculation device 1 may also include output devices other than the display device 24 such as a printer or a speaker.

[Functional Configuration]

Figure 6:
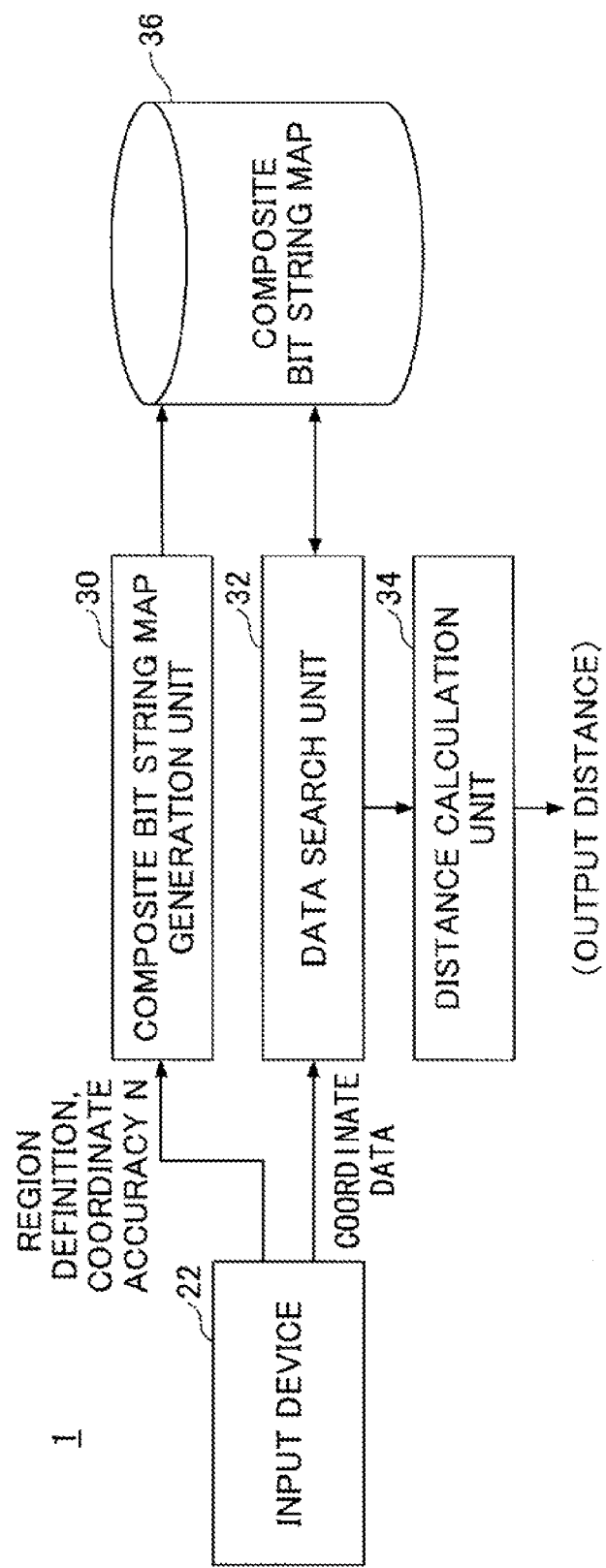
FIG. 6 is a schematic diagram illustrating a functional configuration of a distance calculation device according to the first embodiment of the present invention.

FIG. 6 is a schematic diagram illustrating a functional configuration of the distance calculation device 1 according to the first embodiment of the present invention. The distance calculation apparatus 1 includes a composite bit string map generation unit 30, a data search unit 32, and a distance calculation unit 34. The functions corresponding to these units (function blocks) 30, 32, 34 are performed by having the CPU 10 execute a program or software stored in, for example, the auxiliary storage device 16. The functions of the function blocks do not need to be performed by separate programs but may be performed by being called out as a sub-routine or as a function. Further, a part of the function blocks may be a hardware component such as an IC (integrated Circuit) or a FPGA (Field Programmable Gate Array).

As described below, the composite bit string map generation unit 30 generates a composite bit string map 36 having each point (region) indicated with a desired bit length and stores the generated composite bit string map 36 in, for example, the auxiliary storage device 16 or the memory device 18.

The data search unit 32 uses the composite bit string map 36 stored in the auxiliary storage device 16, the memory device 18, or a ROM and outputs a composite bit string corresponding to coordinate data of two points input from the input device 22. Other than the coordinate data of the two points, the data input to the input device 22 may include, for example, coordinate accuracy N serving as an index for indicating accuracy of a coordinate.

In a case where a target to be processed (process target) is a plane, coordinate data of the process target is expressed by a combination of x and y coordinates in a coordinate system where an x axis and a y axis perpendicularly intersect with each other. In a case where the process target is a sphere, coordinate data of the process target is expressed by longitude v and latitude w. A distance calculation method according to an embodiment of the present invention may be applied to both a plane and a sphere since substantially the same principle is applicable for both a plane and a sphere.

Figure 7B:
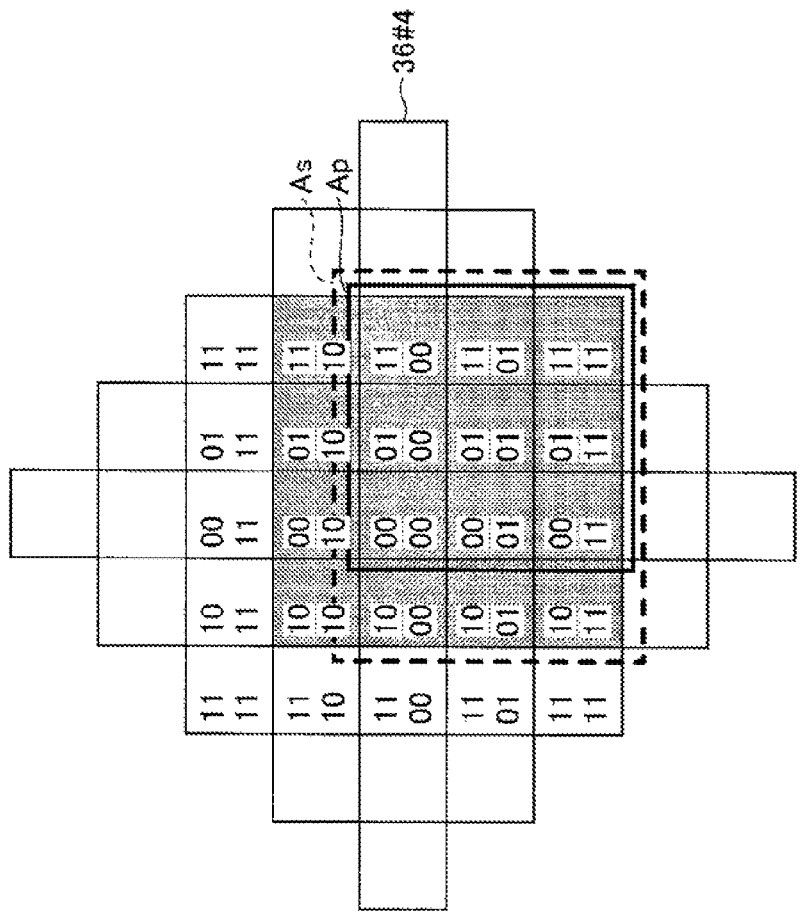
FIGS. 7A and 7B are schematic diagrams illustrating an arrangement of composite bit strings that satisfy both uniqueness and distance retention in a case where the bit lengths are 2 and 4, respectively.
Figure 7A:
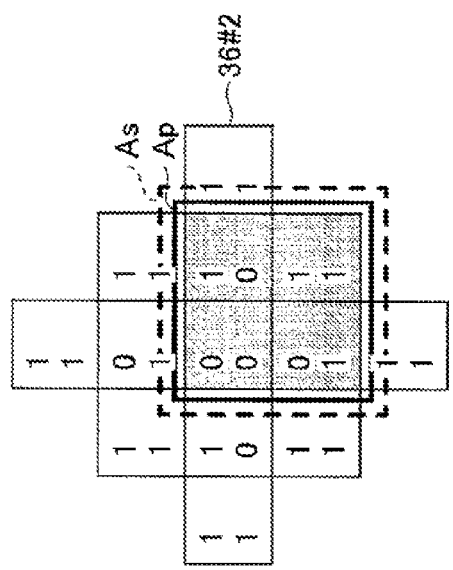
Figure 8:
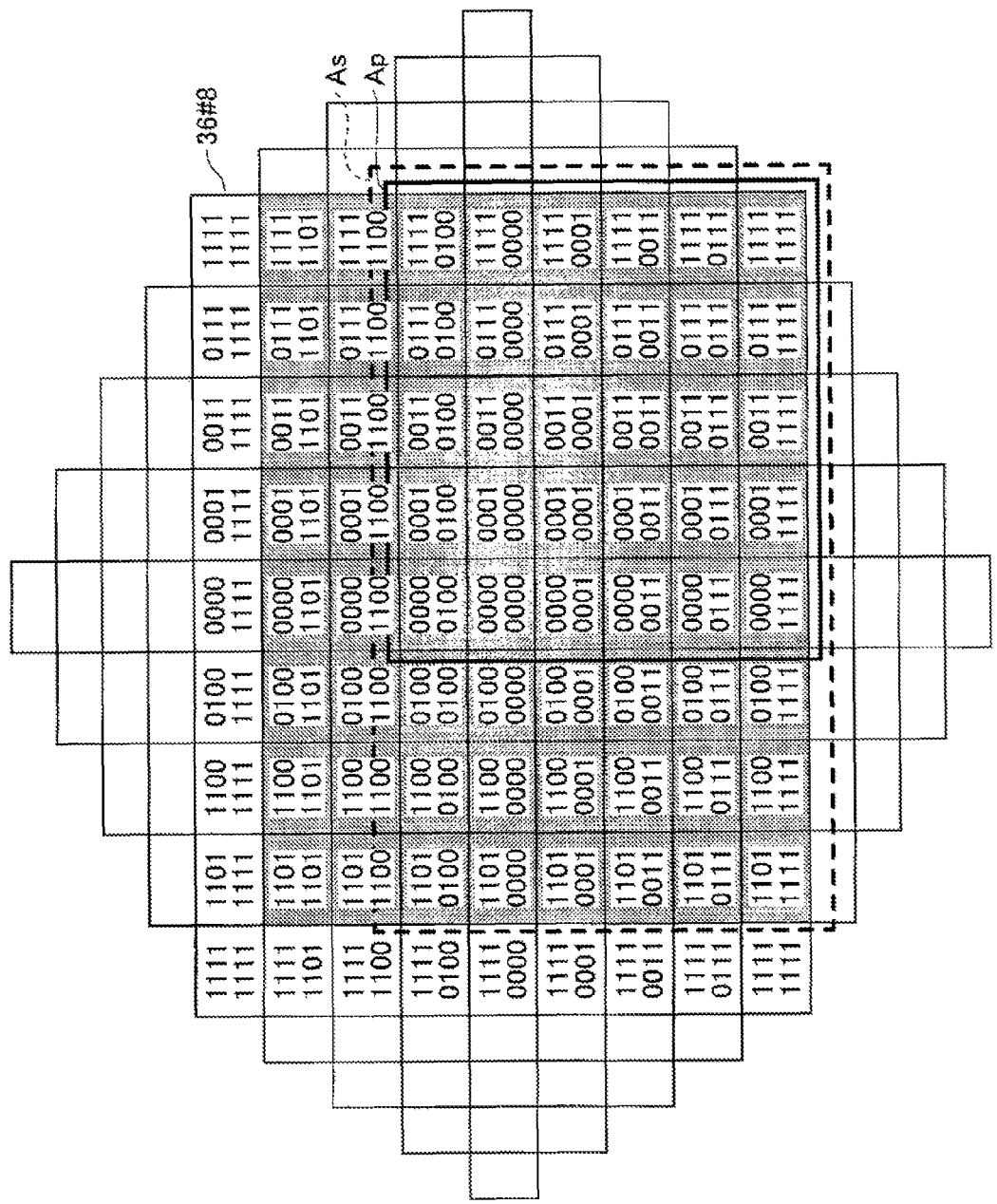
FIG. 8 is a schematic diagram illustrating an arrangement of composite bits strings that satisfy both uniqueness and distance retention in a case where the bit length is 8.

FIGS. 7A and 7B are schematic diagrams illustrating an arrangement of composite bit strings that satisfy both uniqueness and distance retention in a case where the bit lengths are 2 and 4, respectively (composite bit string map 36#2 and composite bit string map 36#4). FIG. 8 is a schematic diagram illustrating an arrangement of composite bits strings that satisfy both uniqueness and distance retention in a case where the bit length is 8. In this embodiment also, the composite bit string is expressed as data having two columns (an upper column to which longitude data is assigned and a lower column to which latitude data is assigned). In FIGS. 7A, 7B, 8, and the following description, each bit value of the composite bit string is assumed as a binary value of 0 or 1.

In FIGS. 7A and 7B, a rectangular region demarcated with a bold solid line corresponds to a region Ap that can be applied to a plane, and a rectangular region demarcated with a broken line corresponds to a region As that can be applied to a sphere. The region Ap is extracted from the composite bit string map 36, so that a reference position "00000000" is positioned in one of an upper left corner, a lower left corner, a upper right corner, and a lower right corner of the region Ap. The region As is extracted from the composite bit string map 36, so that a reference position "00000000" is positioned in either an upper end or a lower end (regardless of whether the upper end or the lower end is positioned on the right side or the left side) of the region As. Alternatively, the region Ap or the region As may be extracted, so that a reference position "11111111" is positioned opposite to the aforementioned position of the reference position "00000000". Further, a reference position may have an arbitrary bit string assigned thereto. For example, a bit string "01101101" may be assigned as a reference position and a bit string "10010010" may be assigned as a block farthest from the reference position.

As illustrated in the region Ap of FIGS. 7A, 7B, and 8, all of the composite bit strings are different (i.e. uniqueness of the region Ap is satisfied). Further, as illustrated in the region Ap of FIGS. 7A, 7B, and 8, a block distance BD and a Hamming distance match between any given two block (i.e. distance retention of the region Ap is satisfied). As described above, the Hamming distance HD indicates the number of different bit values (i.e. the number of inverted (flipped) bits) between the composite bit strings of two blocks. The region As also satisfies uniqueness and distance retention. However, in terms of the blocks having the date line running therebetween (i.e. right and left end parts), a point in which the block distance BD matches the Hamming distance H in the region As is different from a point in which the block distance BD matches the Hamming distance H in the region Ap.

[Generation of Composite Bit String Map 36]

Figure 9:
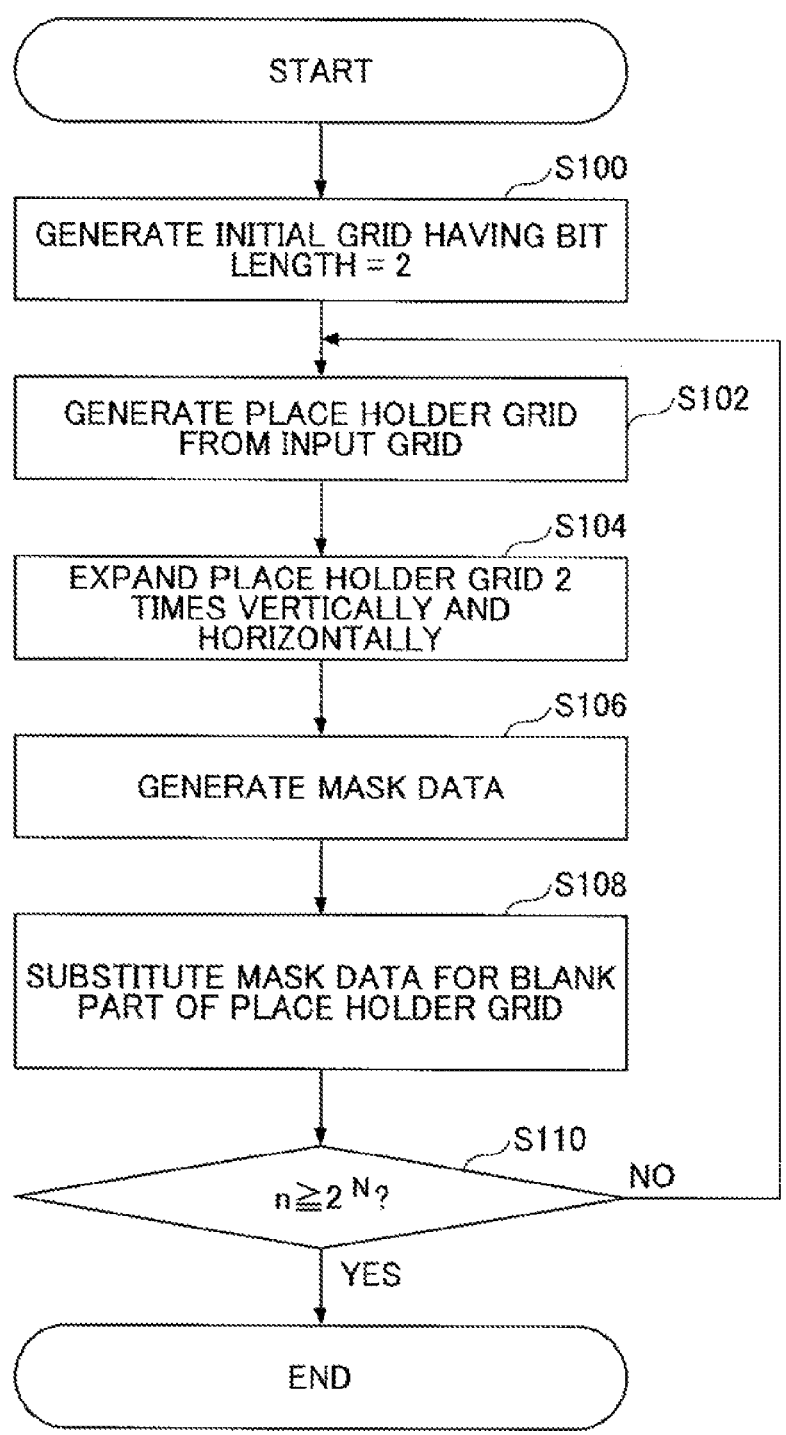
FIG. 9 is a flowchart illustrating a flow of processes of an operation for generating a composite bit string map according to an embodiment of the present invention.

Next, a method for generating a composite bit string map (as illustrated in FIGS. 7A, 7B, and 8) according to an embodiment of the present invention is described. FIG. 9 is a flowchart illustrating a flow of processes of an operation for generating a composite bit string map 36 according to an embodiment of the present invention. The flow of processes illustrated in FIG. 9 is performed by the composite bit string map generation unit 30.

Figures 10, 11:
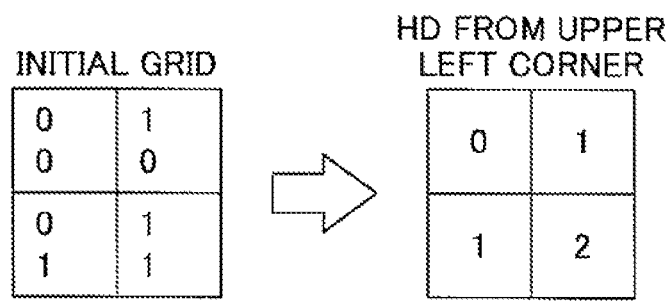
FIG. 10 is a schematic diagram illustrating an initial grid (in a case where the bit length is 2) and the Hamming distance of each block of the initial grid relative to the block positioned on the upper left corner of the initial grid.
FIG. 11 is a schematic diagram illustrating an example of a place holder grid in a case where the bit length is 4.

First, the composite bit string map generation unit 30 generates initial data of a shortest bit length (in this embodiment, bit length=2) and stores the generated initial data in, for example, the memory device 18 (S100). A data structure (as illustrated in FIGS. 7A, 7B, and 8) being divided and having bits strings allocated to the divided parts is hereinafter also referred to as a grid. FIG. 10 is a schematic diagram illustrating an initial grid (in which each region (cell) of the initial grid has a bit length of 2) and the Hamming distance of each block of the initial grid relative to the block positioned on the upper left corner of the initial grid. According to FIG. 10, it can be understood that the block distance RD of the regions of the initial grid match the Hamming distance HD of regions of the initial grid.

Then, the composite bit string map generation unit 30 generates grid data having a data structure obtained by preparing a data space for accommodating bit strings that are twice the length of the bit strings of an input grid (in a case of performing step S102 for the first time, the input grid is the initial grid), embedding target data (in this step, the initial data) into corresponding parts of the data space, and assuming other parts of the data space having no target data embedded therein as blank data. Then, the composite bit string map generation unit 30 stores the generated data structure in, for example, the memory device 18 (S102). The grid data is hereinafter also referred to as a place holder grid 37.

FIG. 11 is a schematic diagram illustrating an example of a place holder grid 37#4 in which each region (cell) of the place holder grid 37#4 has a bit length of 4. In FIG. 11, blank data is indicated with "*". In setting the position of the blank data in the place holder grid 37, for example, "a second half part (lower bit) of an upper part of a composite bit string" or "a lower part of a composite bit string" may be set as blank data. Alternatively, for example, "another part (e.g., first half part, center part) of an upper part of a composite bit string" may be set as the blank data. Alternatively, "another part of a lower part of a composite bit string" may be set as the blank data. Because an upper part of a composite bit string represents longitude and a lower part of a composite bit string represents latitude, it is preferable that the number of blank data allocated to the upper and lower parts of a composite bit string be the same. However, the number of blank data allocated to the upper and lower parts of a composite bit string may be different in a case where latitude and longitude have different accuracies.

In a case where a composite bit string is not divided into upper and lower parts, blank data may be added to a given position such as a tail end of the composite bit string. For example, blank data may be set to the "*" parts in a composite bit string of "0*1*". In another example, blank data may be set to the "*" parts of a composite bit string of "*01*". In yet another example, blank data may be the "*" parts in a composite bit string of "01**".

Then, the composite bit string map generation unit 30 expands the place holder grid 37 two times in vertical and horizontal directions, so that each region of the place holder grid 37 illustrated in FIG. 11 forms a 2×2 matrix including the same composite bit string, and then, the composite bit string map generation unit 30 stores data of the expanded place holder grid in, for example, the memory device 18 (S104).

FIG. 12 is a schematic diagram illustrating an example of a place holder grid 37#4! (formed by expanding the place holder grid 37#4 two times) in which each region (cell) of the place holder grid 37#4! has a bit length of 4.

Then, the composite bit string map generation part 30 generates mask data 38 in correspondence with the bit length of each region of the bit holder grid 37 and stores the mask data 38 in, for example, the memory device 18 (S106). The mask data is generated based on a predetermined rule. The predetermined rule may be, for example, to allocate many 0s (zeros) in a center part of the place holder grid and allocate many is (ones) in a periphery part of the place holder grid. Alternatively, the predetermined rule may be, for example, to allocate many is (ones) in a center part of the place holder grid and allocate many 0s (zeros) in a center part of the place holder grid. Alternatively, the predetermined rule may be, for example, to allocate arbitrary data in a center part of the place holder grid and allocate many inverted bits relative to the arbitrary data in a periphery part of the place holder grid.

Accordingly, the number of inverted (different) bits compared to the composite bit strings stored in the block of the reference position increases as the distance between a certain block in the place holder grid and a block of a reference position (e.g., a block at a center area) in the place holder grid becomes larger. FIG. 13 is a schematic diagram illustrating an example of mask data 38#4 in which each region (cell) of the mask data 38 has a bit length of 4.

Figure 14:
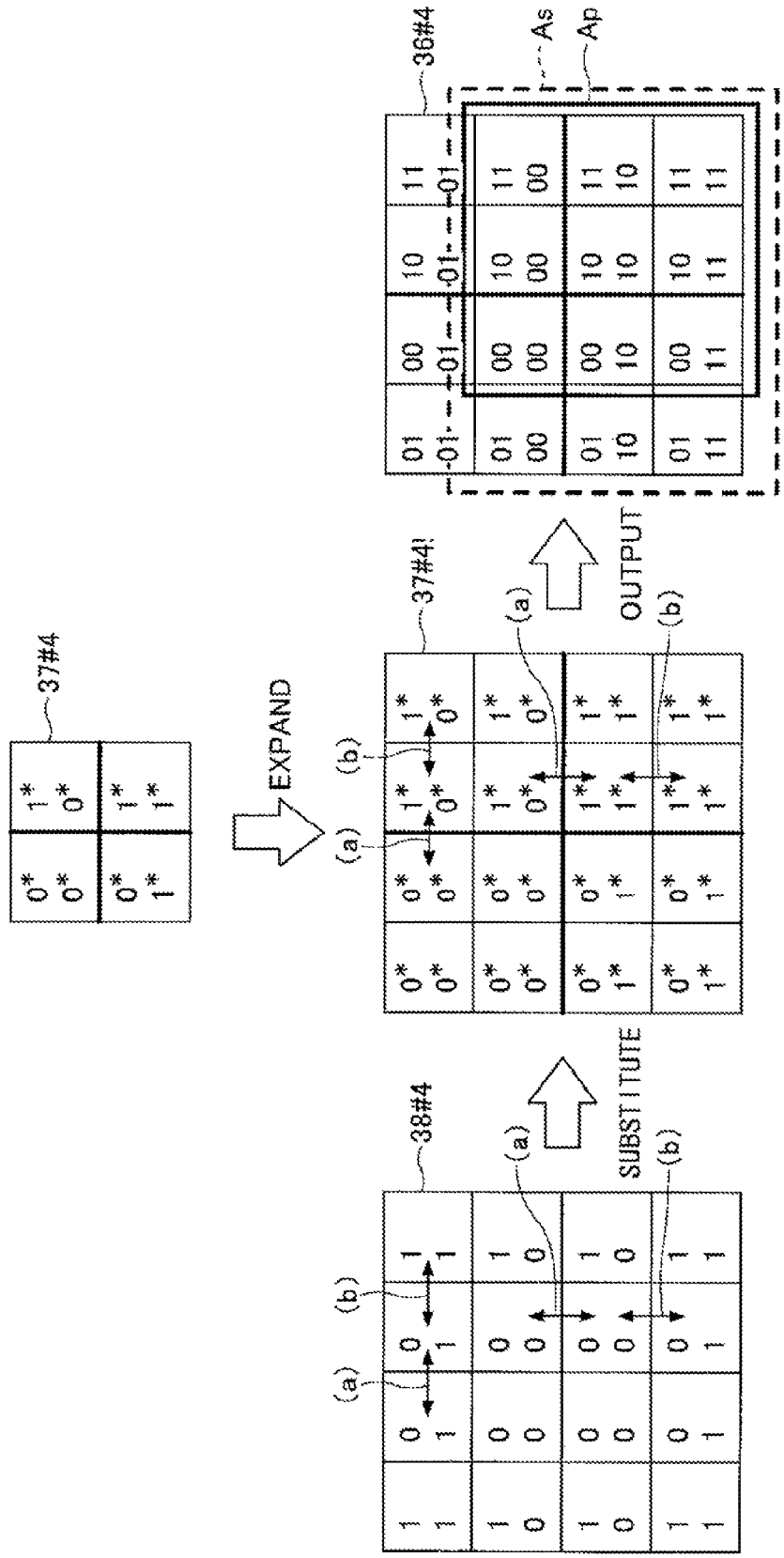
FIG. 14 is a schematic diagram illustrating how a composite bit string map is generated from a place holder grid and a mask data.

After generating the mask data 38, the composite bit string map generating unit 30 substitutes blank data parts of the place holder grid 37 with a composite bit string map 36, and stores the substituted data in, for example, the memory device 18 (S108). FIG. 14 is a schematic diagram illustrating how a composite bit string map 36#4 is generated from the place holder grid 37#4! and the mask data 38. As illustrated in FIG. 14, a region Ap and a region As, which are extracted from the generated composite bit string map area 36#4, satisfy uniqueness and distance retention.

Then, the composite bit string map generation unit 30 determines whether the bit length n of the generated composite bit map 36 is greater than or equal to $2^N$ (S110). In this embodiment, a coordinate accuracy N is an index value guaranteeing that two points separated no less than (H–L)/2N from each other can be distinguished. Further, the coordinate accuracy N is a value which designates the number of times in which the above-described region dividing process (S102-S108) is to be performed.

In a case where the bit length is less than $2^N$ (No in S110), the composite bit string generation unit 30 designates the most previously generated composite bit string map 36 as the input grid and returns to Step S102. Then, the composite bit generation part 30 repeats the processes S102-S108 until the bit string length n becomes greater than or equal to $2^N$.

Figure 15:
FIG. 15 is a schematic diagram illustrating how a place holder grid (in a case where the bit length is 8 bits) is generated from a composite bit string map (in a case where the bit length is 4 bits) according to an embodiment of the present invention.
Figure 16:
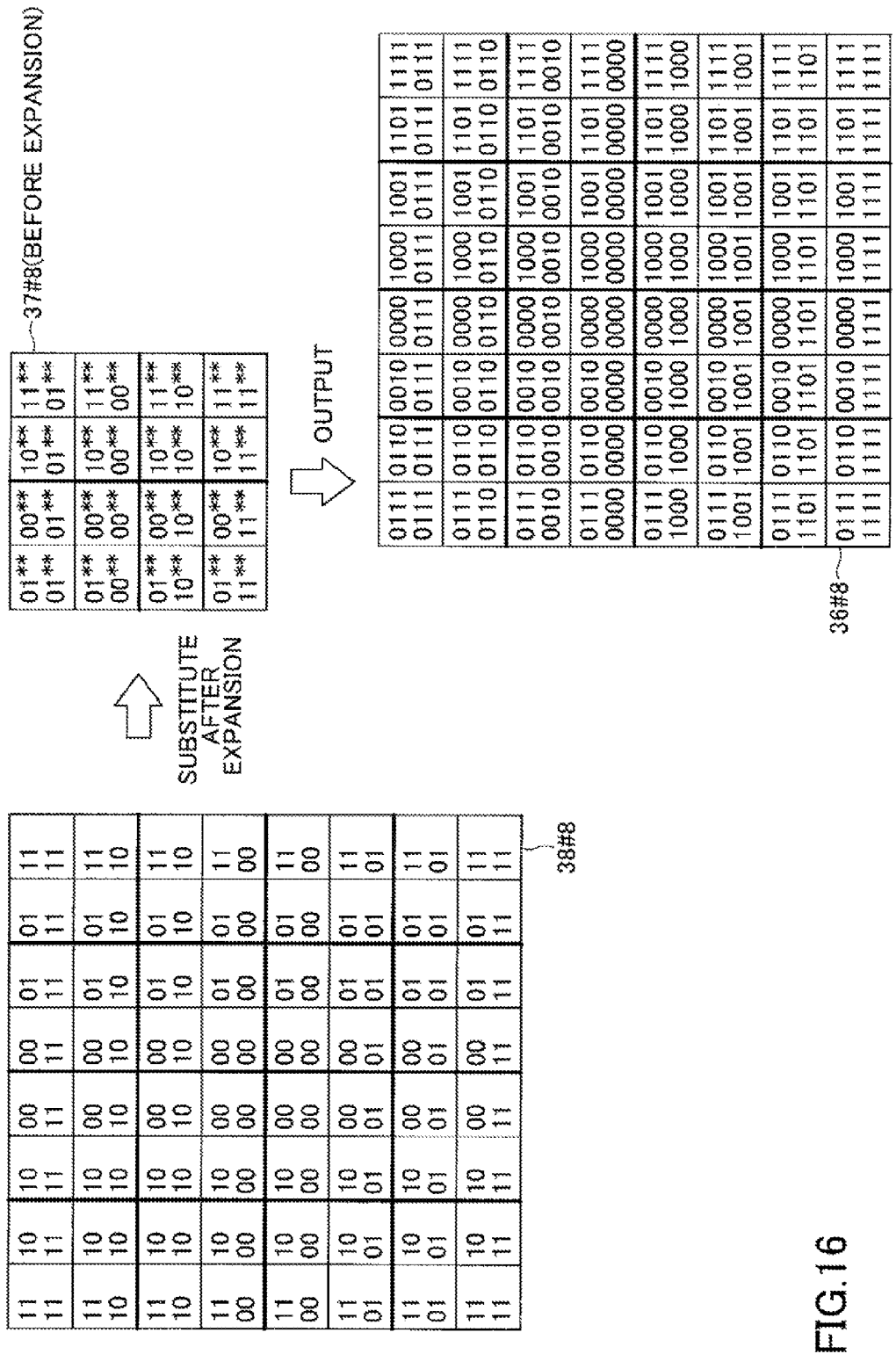
FIG. 16 is a schematic diagram illustrating how a composite bit string map (in a case where the bit length is 8 bits) from a place holder grid (in a case where the bit length is 8 bits) and mask data (in a case where the bit length is 8) according to an embodiment of the present invention.

FIG. 15 is a schematic diagram illustrating how a place holder grid 37#8 (each region of the place holder grid 37#8 having a bit length of 8 bits) is generated from a composite bit string map 36#4 (each region of the composite bit string map 36#4 having a bit length of 4 bits) according to an embodiment of the present invention. FIG. 16 is a schematic diagram illustrating how a composite bit string map 36#8 (each region of the composite bit string map 36#8 having a bit length of 8 bits) from a place holder grid 37#8 (each region of the place holder grid 37#8 having a bit length of 8 bits) and mask data 38#8 (each region of the mask data 38#8 having a bit length of 8) according to an embodiment of the present invention.

Figure 23:
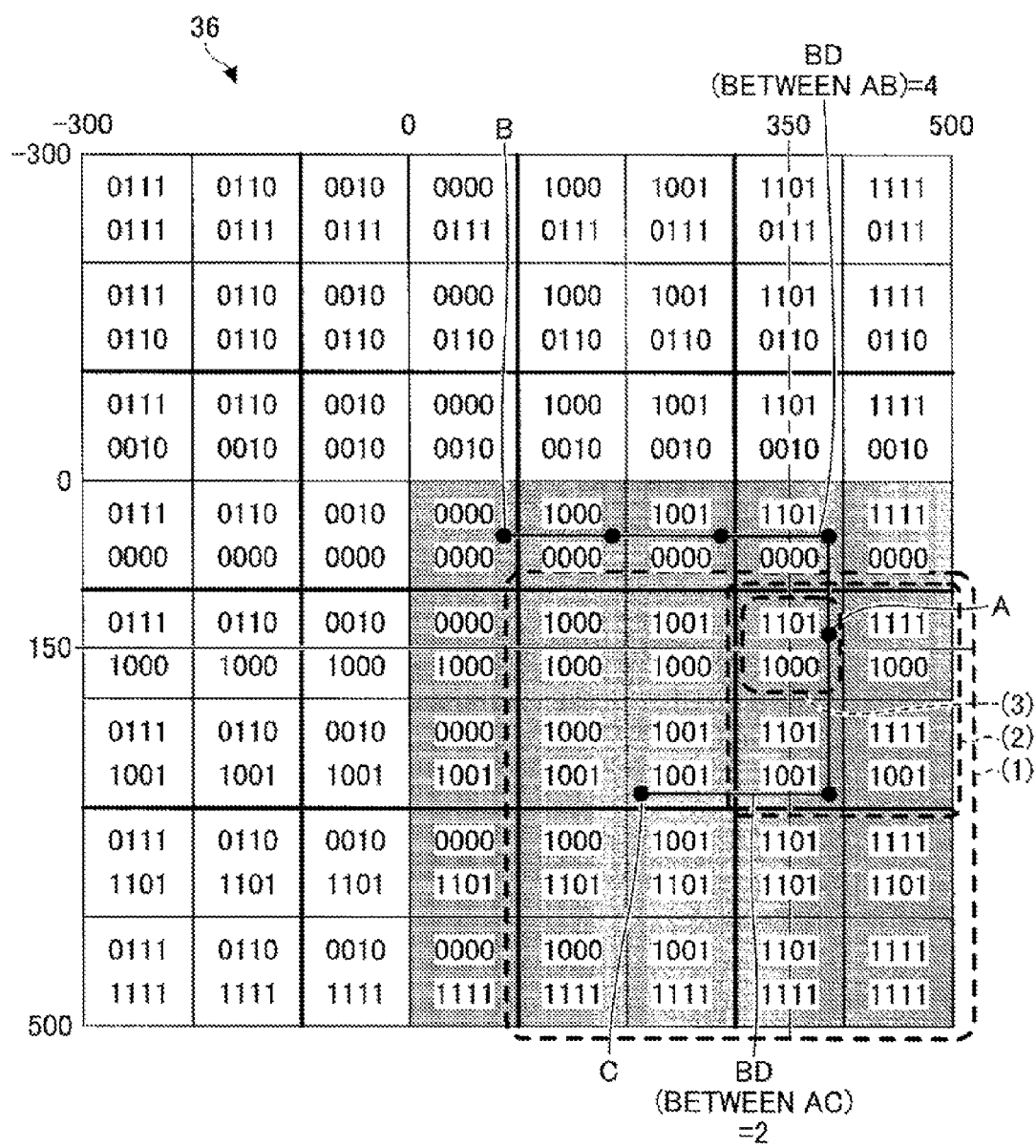
FIG. 23 is a schematic diagram illustrating how a composite bit string is determined based on a composite bit string map.

By performing the processes described with FIG. 9, a composite bit string map 36 having each point (region) indicated with a desired bit length and satisfying both uniqueness and distance retention is obtained. The composite bit string map 36 can be stored in correspondence with coordinate data (i.e. geographical coordinates). The manner in which the composite bit string map 36 corresponds to geographical coordinates is illustrated in FIG. 23 (also used to describe the following second embodiment). In FIG. 23, [–300 to 500] in the vertical and horizontal directions of the composite bit string map 36 indicate geographical coordinates.

The data search unit 32 searches for two blocks in the composite bit string map 36 that correspond to coordinate data of two points input from the input device 22 and outputs two composite bit strings stored in the two blocks.

The distance calculation unit 34 counts the number of inverted bits between the two composite bit strings output from the data search unit 32 and outputs the distance between the two points in accordance with the number of inverted bits. The distance that is output in accordance with the number of inverted bits is the block distance between the two points. Thus, by using the composite bit string map 36 satisfying uniqueness and distance retention, the distance between two points can be calculated a simple process of counting the number of inverted bits.

It is to be noted that the composite bit string map 36 may be stored beforehand in a storage unit such as the auxiliary storage device 16 or a ROM. In such a case where the composite bit string map 36 is stored in the storage unit beforehand, the composite bit string map generation unit 30 may be omitted from the configuration of the distance calculation apparatus 1.

Hence, with the distance calculation apparatus 1 according to the above-described embodiment of the present invention, the distance between plural coordinates can be easily calculated by extracting composite bit strings corresponding to plural coordinates by using the composite bit string map 36 that satisfies uniqueness and distance retention and counting the number of inverted bits between the extracted composite bit strings.

Second Embodiment

Next, a coordinate coding apparatus 2, a coordinate coding method, and a coordinate coding program according to a second embodiment of the present invention are described with reference to the drawings.

[Hardware Configuration]

The hardware configuration of the coordinate coding apparatus 2 is substantially the same as that of the distance calculation apparatus 1 of the first embodiment. Therefore, the hardware configuration of the coordinate coding apparatus 2 is described with reference to FIG. 2. Through the following description and drawings of the second embodiment, like components are denoted by like reference numerals as those of the first embodiment and are not further explained.

[Functional Configuration]

Figure 17:
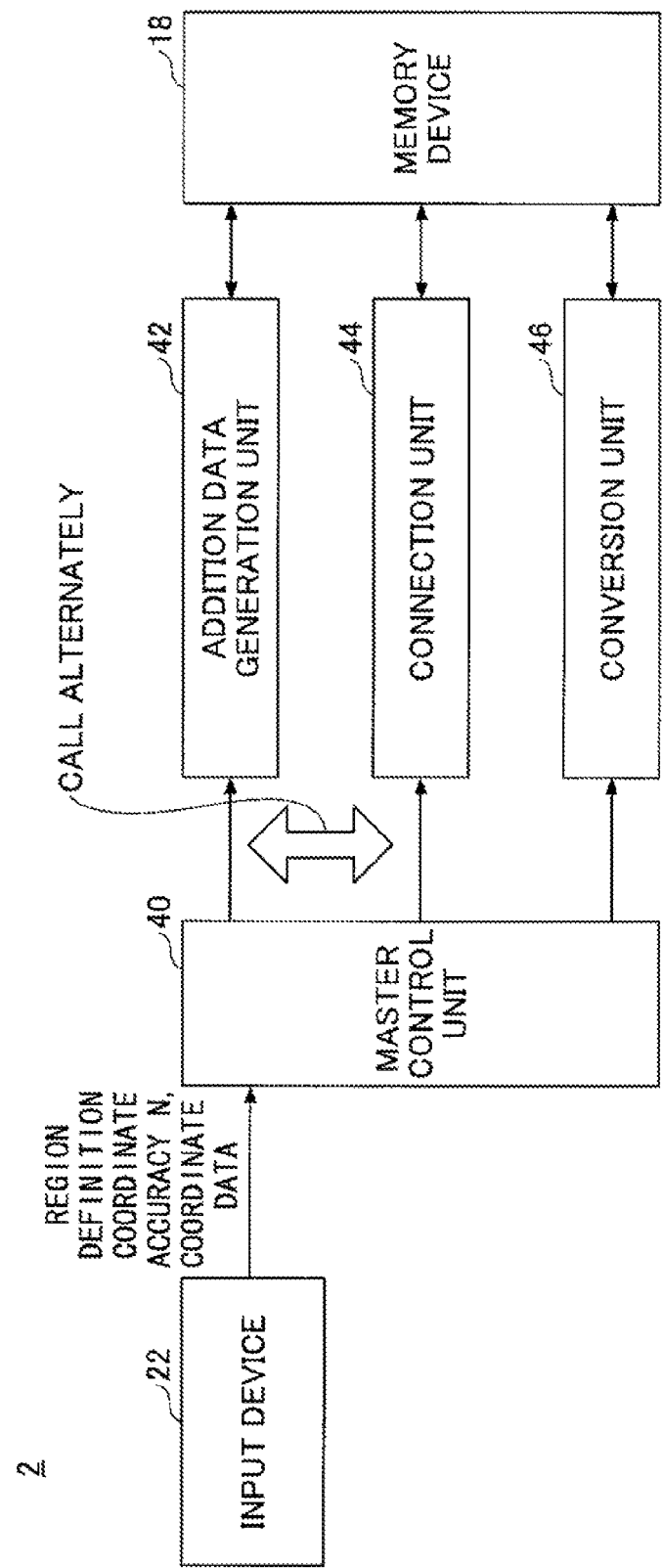
FIG. 17 is a schematic diagram illustrating a functional configuration of a coordinate coding device according to a second embodiment of the present invention.

FIG. 17 is a schematic diagram illustrating a functional configuration of the coordinate coding device 2 according to the second embodiment of the present invention. The coordinate coding apparatus 2 includes a master control unit 40, an addition data generation unit 42, a connection unit 44, and a conversion unit 46. The functions corresponding to these units (function blocks) 40, 42, 44, and 46 are performed by having the CPU 10 execute a program or software stored in, for example, the auxiliary storage device 16. The functions of the function blocks do not need to be performed by separate programs but may be performed by being called out as a sub-routine or as a function. Further, a part of the function blocks may be a hardware component such as an IC (Integrated Circuit) or a FPGA (Field Programmable Gate Array).

The master control part 40 controls the addition data generation part 42 and the connection unit 44, so that composite bit strings corresponding to coordinate data input from the input device 22 are output. As for data input from the input device 22 besides coordinate data, there is, for example, data pertaining to coordinate accuracy N (coordinate accuracy data) which is an index indicating accuracy of a coordinate.

Similar to the first embodiment, in a case where the process target is a plane, coordinate data of the process target is expressed with a combination of x and y coordinates in a coordinate system where an x axis and a y axis perpendicularly intersect with each other. In a case where the process target is a sphere, the coordinate data of the process target is expressed by longitude v and latitude w. A coordinate coding method according to an embodiment of the present invention may be applied to both a plane and a sphere since substantially the same principle is applicable for both the plane and the sphere.

[Process of Deriving Composite Bit String from Coordinate Data]

The addition data generation unit 42 performs a process in accordance with the above-described process of generating mask data 38 of the first embodiment. Further, the connection unit 44 performs a process in accordance with the above-described process of preparing the place holder grid 37, storing the mask data 38, and generating the composite bit string map 36 of the first embodiment. It is, however, to be noted that the function blocks of the addition data generation unit 42 and the connection unit 44 (function blocks) according to the second embodiment convert coordinate data to bit strings without having to generate specific map data (grid) described in the first embodiment by using the below-described algorithm. The processes performed with the functions blocks illustrated in FIG. 17 are explained in detail with the below-described flowcharts of FIGS. 21 and 22.

Figures 18, 19:
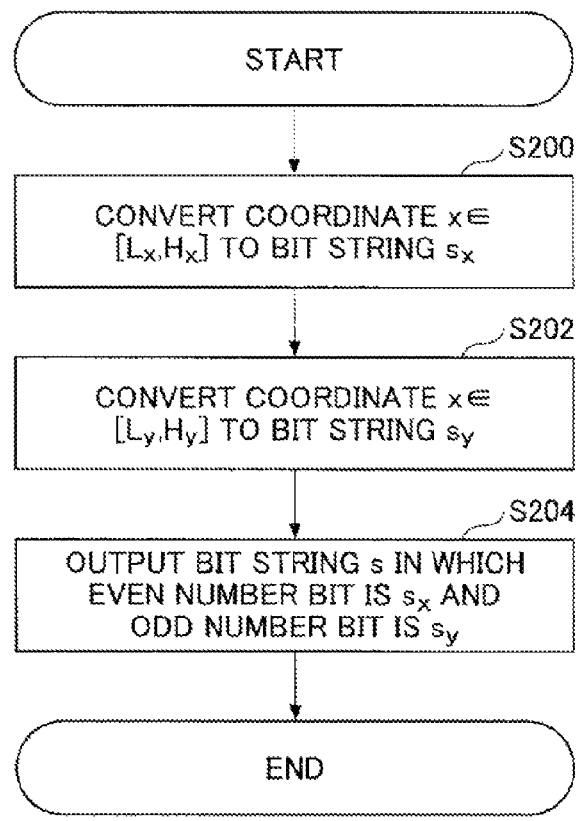
FIG. 18 is a flowchart illustrating an overview of processes performed by a coordinate coding apparatus in a case where a process target is a plane.
FIG. 19 is a schematic diagram illustrating an example of how a composite bit string is generated from two bit strings.

FIG. 18 is a flowchart illustrating an overview of the processes performed by the coordinate coding apparatus 2 in a case where the process target is a plane. In this embodiment, an input coordinate data is assumed as (x, y), an output composite bit string is assumed as (s), a lower limit value of an x coordinate is assumed as Lx, an upper limit value of an x coordinate is assumed as Hx, a lower limit value of a y coordinate is assumed as Ly, an upper limit value of a y coordinate is assumed as Hy, and coordinate accuracy is assumed as N, respectively.

In this embodiment, the upper and lower limit values Lx, Hx of x coordinates are set beforehand (i.e. before performing the processes illustrated in FIG. 18), so that the upper and lower values Lx, Hx of x coordinates are either located in positions matching an outer rim of the region Ap described in the first embodiment or positions more inward than the outer rim of the region Ap (see, for example, FIG. 7). Likewise, the upper and lower limit values Lx, Hx of y coordinates are set beforehand (i.e. before performing the processes illustrated in FIG. 18), so that the upper and lower values Ly, Hy of y coordinates are either located in positions matching an outer rim of the region Ap or positions more inward than the outer rim of the region Ap (see, for example, FIG. 7).

First, the coordinate coding apparatus 2 converts the x coordinates between the upper and the lower limit values Lx, Hx into bit strings sx and outputs the bit strings sx (Step S200).

Then, the coordinate coding apparatus 2 converts the y coordinates between the upper and the lower limit values Lx, Hx into bit strings sy and outputs the bit strings sy (Step S202).

For example, in a case where one of the x and y coordinates (x, y) deviates from the range between the upper and lower limit values, an error may be output.

Then, the coordinate coding apparatus 2 generates and outputs a composite bit string "s" in which an even number bit of the composite bit string "s" is assumed as "sx" and an odd number bit of the composite bit string "s" is assumed as "sy" (Step S204). FIG. 19 is a schematic diagram illustrating an example of how the composite bit string "s" is generated from the bit string "sx" and the bit string "sy". It is, however, to be noted that the rule for generating a composite bit string is not to be limited to the rule applied to the example illustrated in FIG. 19. As described in the first embodiment, various rules may be used for generating the composite bit string.

Figure 20:
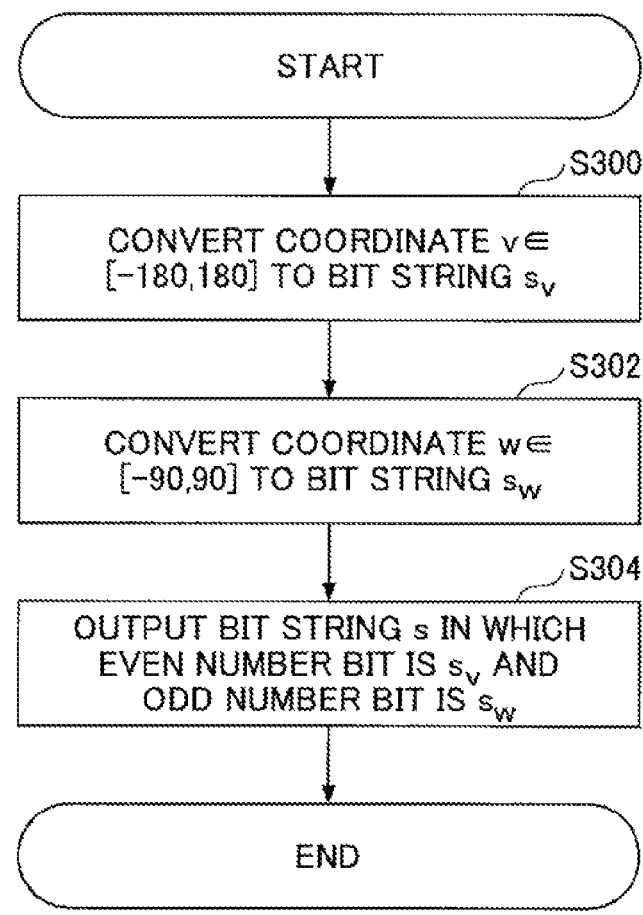
FIG. 20 is a flowchart illustrating an overview of processes performed by a coordinate coding apparatus in a case where a process target is a sphere.

FIG. 20 is a flowchart illustrating an overview of the processes performed by the coordinate coding apparatus 2 in a case where the process target is a sphere. In this embodiment, an input coordinate data is assumed as (v, w), an output composite bit string is assumed as (s), a lower limit value of longitude v is assumed as −180, an upper limit value of longitude v is assumed as 180, a lower limit value of latitude w is assumed as −90, an upper limit value of latitude w is assumed as 90, and coordinate accuracy is assumed as N, respectively.

In this embodiment, the upper and lower limit values Lx, Hx of x coordinates are set beforehand (i.e. before performing the processes illustrated in FIG. 20), so that the upper and lower values Lx, Hx of x coordinates are either located in positions matching an outer rim of the region As described in the first embodiment or positions more inward than the outer rim of the region As (see, for example, FIG. 7). Likewise, the upper and lower limit values Ly, Hy of y coordinates are set beforehand (i.e. before performing the processes illustrated in FIG. 20), so that the upper and lower values Ly, Hy of y coordinates are either located in positions matching an outer rim of the region As or positions more inward than the outer rim of the region As (see, for example, FIG. 7).

First, the coordinate coding apparatus 2 converts the coordinates v between the upper and the lower limit values −180, 180 into bit strings sv and outputs the bit strings sv (Step S300).

Then, the coordinate coding apparatus 2 converts the coordinates w between the upper and the lower limit values −90, 90 into bit strings sw and outputs the bit strings sw (Step S302).

For example, in a case where one of the v and w coordinates (v, w) deviates from the range between the upper and lower limit values, an error may be output.

Then, the coordinate coding apparatus 2 generates and outputs a composite bit string "s" in which an even number bit of the composite bit string "s" is assumed as "sv" and an odd number bit of the composite bit string "s" is assumed as "sw" (Step S304). The composite bit string s is generated substantially in the same manner illustrated in FIG. 19. Thus, further description of the generation of the composite bit string s of FIG. 20 is omitted.

Next, the above-described processes of converting coordinates into bit strings (illustrated in Steps S200, S202 of FIG. 18 and Steps S300, S302 of FIG. 20) are described in further detail.

Figure 21:
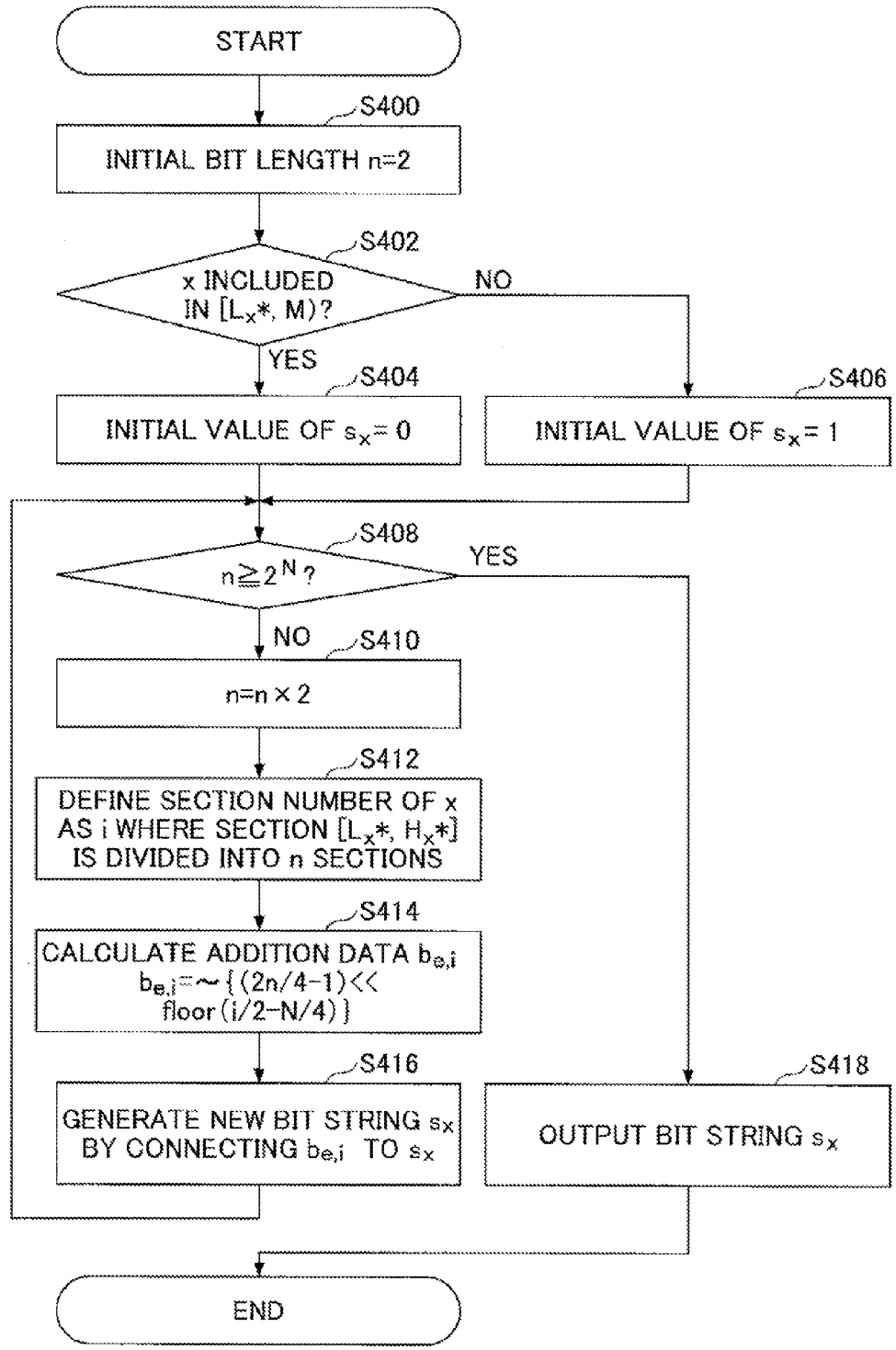
FIG. 21 is a sub-flow illustrating a flow of an operation executed by a coordinate coding apparatus where an x coordinate or a v coordinate is converted into a bit string according to an embodiment of the present invention.

First, an example of an operation of converting an x coordinate (coordinate in a horizontal direction) or a v coordinate into a bit string is described. FIG. 21 is a sub-flow illustrating a flow of an operation executed by the coordinate coding apparatus 2 where an x coordinate or a v coordinate is converted into a bit string according to an embodiment of the present invention. The processes performed in step S200 of FIG. 18 and step S300 in FIG. 20 are performed in accordance with the operation illustrated in FIG. 21. Although the example illustrated in FIG. 21 only describes converting coordinate x into bit string sx, the example also applies to converting coordinate v into bit string sv.

First, the master control unit 40 defines that the initial bit length n of the composite bit string is 2 (Step S400). Then, the master control unit 40 determines whether the coordinate x is included in a section [Lx*, M) (Step S402). In this embodiment, "Lx*" or "Hx*" indicates an outer rim of the composite bit string map 36 (an outer rim of a region satisfying uniqueness) before extracting the region Ap or the region As from the composite bit string map 36. Further, "M" indicates a midpoint of the Lx* and Hx* {(Lx*+Hx*)/2}.

In a case where the coordinate x is included in the section [Lx*, M], the initial value of the bit string sx is 0 (Step S404). On the other hand, in a case where the coordinate x is included in the [M, Hx*], the initial value of the bit string sx is 1 (Step S406).

Then, the master control unit 40 determines whether the bit length n is greater than or equal to $2^N$ (Step S408). The coordinate accuracy N is an index value guaranteeing that two points separated no less than $(H-L)/2^N$ from each other can be distinguished. Further, the coordinate accuracy N is also a value which designates the number of times in which the above-described loop process of S410-S416 is to be performed.

In a case where the bit length n is less than $2^N$, the addition data generation unit 42 multiplies the bit length "n" by two (Step S410). Then, among a group of sections formed by equally dividing section [Lx*, Hx*] into n sections, the addition data generation unit 42 defines "i" as the number of the section to which the coordinate x belongs (Step S412). In this embodiment, "i" satisfies a relationship of 1≤i≤n in a case where sections are sequentially counted 1, 2, 3, . . . n, for example, from a leftmost section of the group of sections.

Then, an addition data indicated as "$b_{e,i}$" is calculated by using the following Formula (1). It is to be noted that the subscript "e" of the addition data "$b_{e,i}$" represents even, that is, an even bit (i.e. the bit string of the upper column of the composite bit string indicated with two column). In Formula (1), "~" represents a NOT operator (inversion), "<<" represents a logic shift operator to the left direction, and "floor" is a function representing to round down.

$$b_{e,i} = \sim\{(2^{n/4}-1 << \text{floor}(i/2-n/4)\} \quad \text{[Formula (1)]}$$

The process of calculating the addition data "$b_{e,i}$" is equivalent to the above-described process of the first embodiment where an upper column bit string stored in a block having a horizontal direction indicated with "i" is extracted from the mask data 38 in which each region (cell) of the mask data 38 has a bit length of n. With the first embodiment, a bit string of a corresponding point (location) is extracted after generating the mask data 38 of an entire area. On the other hand, with the second embodiment, a bit string of a corresponding point (location) is calculated directly (i.e. calculating the bit string of the corresponding point (location) without having to generate mask data).

After the addition data "$b_{e,i}$" is calculated, the connection unit 44 connects the addition data "$b_{e,i}$" to the bit string sx and stores a new bit string sx (i.e. bit string connected with the addition data "$b_{e,i}$") in, for example, the memory device 18 (Step S416). Then, the operation of FIG. 21 returns to the determining step of S408.

In a case where the master control unit 40 determines that the bit length n is greater than or equal to $2^N$ (Step S408), the master control unit 40 outputs the bit string sx stored in, for example, the memory device 18 at the time when the master control unit 40 determines that the bit length n is greater than or equal to $2^N$ (Step S418). After the bit string sx is output, the operation of FIG. 21 is terminated.

Figure 22:
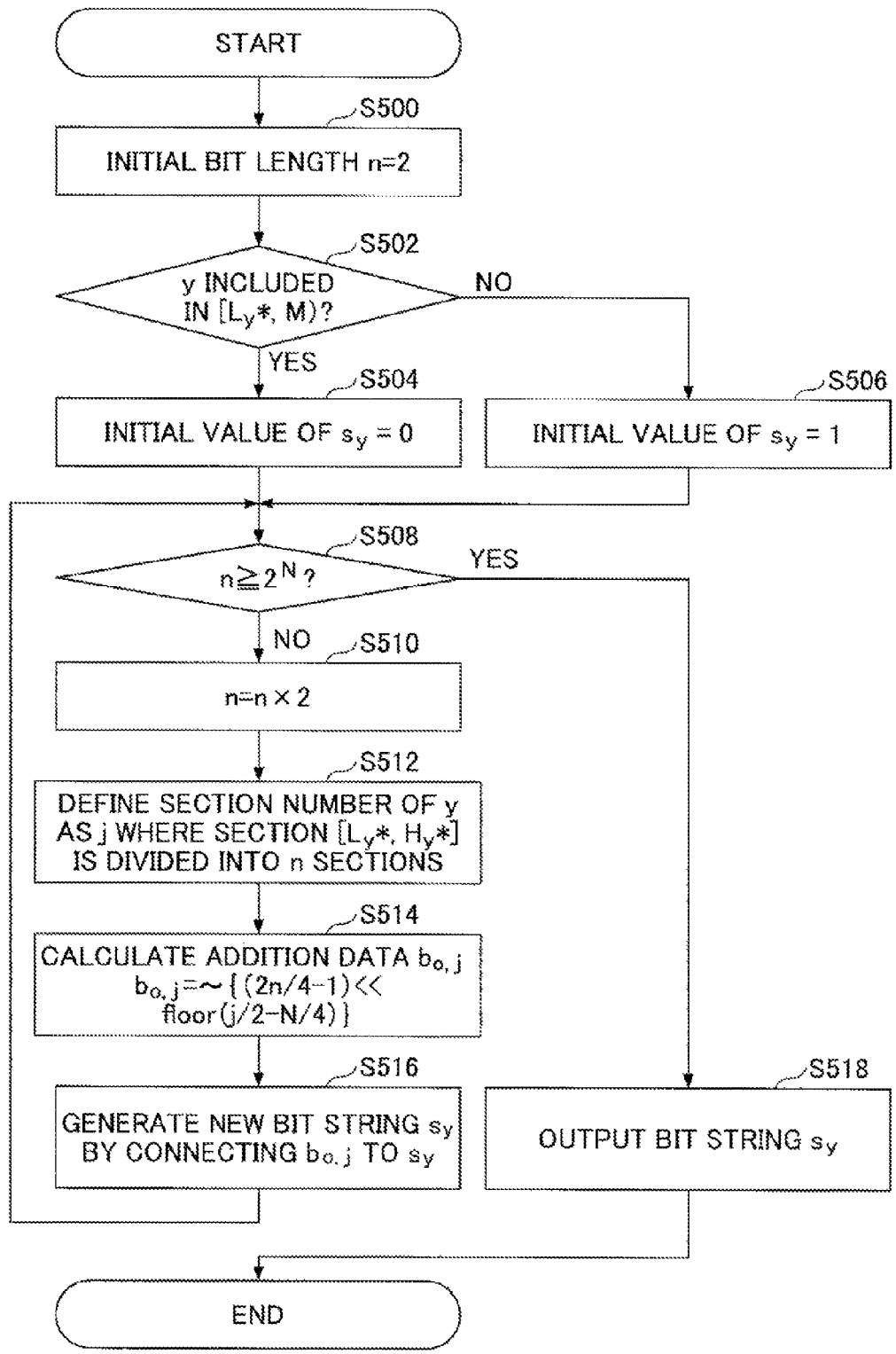
FIG. 22 is a sub-flow illustrating a flow of an operation executed by a coordinate coding apparatus where a y coordinate or a w coordinate is converted into a bit string according to an embodiment of the present invention.

Next, an operation of converting a y coordinate (coordinate in a vertical direction) or a w coordinate into a bit string is described. FIG. 22 is a sub-flow illustrating a flow of an operation executed by the coordinate coding apparatus 2 where a y coordinate or a w coordinate is converted into a bit string according to an embodiment of the present invention. The processes performed in step S202 of FIG. 18 and step S302 in FIG. 20 are performed in accordance with the operation illustrated in FIG. 22. Although the example illustrated in FIG. 22 only describes converting coordinate y into bit string sy, the example also applies to converting coordinate w into bit string sw.

First, the master control unit 40 defines that the initial bit length n of the composite bit string is 2 (Step S500). Then, the master control unit 40 determines whether the coordinate y is included in a section [Ly*, M) (Step S502). In this embodiment, "M" indicates a midpoint of the Ly* and Hy* {(Ly*+Hy*)/2}. "Ly*" or "Hy*" indicates an outer rim of the composite bit string map 36 before extracting the region Ap or the region As from the composite bit string map 36.

In a case where the coordinate y is included in the section [Ly*, M), the initial value of the bit string sy is 0 (Step S504). On the other hand, in a case where the coordinate v is included in the [M, Hy*], the initial value of the bit string sv is 1 (Step S506).

Then, the master control unit 40 determines whether the bit length n is greater than or equal to $2^N$ (Step S508). The coordinate accuracy N is an index value guaranteeing that two points separated no less than $(H-L)/2^N$ from each other can be distinguished. Further, the coordinate accuracy N is also a value which designates the number of times in which the above-described loop process of S510-S516 is to be performed.

In a case where the bit length n is less than $2^N$, the addition data generation unit 42 multiplies the bit length "n" by two (Step S510). Then, among a group of sections formed by equally dividing section [Ly*, Hy*] into n sections, the addition data generation unit 42 defines "i" as the number of the section to which the coordinate y belongs (Step S512). In this embodiment, "i" satisfies a relationship of 1≤i≤n in a case where sections are sequentially counted 1, 2, 3, . . . n, for example, from a section at the bottom of the group of sections.

Then, an addition data indicated as "$b_{o,i}$" is calculated by using the following Formula (2). It is to be noted that the subscript "o" of the addition data "$b_{o,i}$" represents odd, that is, an odd bit (i.e. the bit string of the lower column of the composite bit string indicated with two columns). In Formula (2), "~" represents a NOT operator (inversion), "<<" represents a logic shift operator, and "floor" is a function representing to round down.

$$b_{o,i} = \sim\{(2^{n/4}-1 << \text{floor}(j/2-n/4)\} \quad \text{[Formula (2)]}$$

The process of calculating the addition data "$b_{o,i}$" is equivalent to the above-described process of the first embodiment where a lower column bit string stored in a block having a vertical direction indicated with "j" is extracted from the mask data 38 in which each region (cell) of the mask data 38 has a bit length of n. With the first embodiment, a bit string of a corresponding point (location) is extracted after generating the mask data 38 of an entire area. On the other hand, with the second embodiment, a bit string of a corresponding point (location) is calculated directly (i.e. calculating the bit string of the corresponding point (location) without having to generate mask data).

After the addition data "$b_{o,i}$" is calculated, the connection unit 44 connects the addition data "$b_{o,i}$" to the bit string sy and stores a new bit string sy (i.e. bit string connected with the addition data "$b_{o,i}$") in, for example, the memory device 18 (Step S516). Then, the operation of FIG. 22 returns to the determining step of S508.

In a case where the master control unit 40 determines that the bit length n is greater than or equal to $2^N$ (Step S508), the master control unit 40 outputs the bit string sy stored in, for example, the memory device 18 at the time when the master control unit 40 determines that the bit length n is greater than or equal to $2^N$ (Step S518). After the bit string sy is output, the operation of FIG. 22 is terminated.

A supplementary explanation of the property of the addition data calculated by the addition data generation unit 42 is as follows. The mask data 38 of the first embodiment, which has substantially the same property as that of the addition data (see, for example, FIGS. 13 and 16), can be generated by using the above-described Formulas (1) and (2). In other words, the process of generating addition data with the addition data generation unit 42 has substantially the same significance as the process of extracting mask data from a desired block after generating the mask data 38.

The bit length of the addition data "$b_{e,i}$", and the bit length of the addition data "$b_{o,i}$" is ¼ relative to the bit length n, respectively. The bit length of a composite addition data (which is obtained by compositing the addition data "$b_{o,i}$" and the addition data "$b_{o,i}$" and indicated in two columns) is ½ relative to the bit length n.

For example, the bits of the addition data "$b_{e,i}$" (upper column) are all 0 in the blocks located in the two rows at the center relative to the horizontal direction (see, for example, mask data 38 of FIG. 14). Further, 0s are sequentially replaced with 1s from a bottom bit of the addition data "$b_{e,i}$" every other block located on the right side relative to the center. Further, the bits of the "$b_{e,i}$" are all 1 at the rightmost block relative to the center. Further, 1s are sequentially replaced with 0s from a top bit of the addition data "$b_{e,i}$" every other block located on the left side relative to the center. Further, the bits of the "$b_{e,i}$" are all 1 at the leftmost block relative to the center.

Further, the bits of the addition data "$b_{o,i}$" (lower column) are all 0 in the blocks located in the two rows at the center relative to the vertical direction (see, for example, mask data 38 of FIG. 14). Further, 0s are sequentially replaced with 1s from a bottom bit of the addition data "$b_{o,i}$" every other block located below center. Further, the bits of the "$b_{o,i}$" are all 1 at the bottommost block relative to the center. Further, 1s are sequentially replaced with 0s from a top bit of the addition data "$b_{o,i}$" every other block located above the center. Further, the bits of the "$b_{o,i}$" are all 1 at the uppermost block relative to the center.

It is to be noted that the above-described relationship between 0 and 1 of the addition data may be opposite (i.e. 0 could be instead 1 and 1 could be instead 0). Further, the arrangement of 0s or 1s does not necessarily have to be concentrated in the blocks located at the center area.

The process of connecting data with the connection part 44 has substantially the same significance as the process of substituting an expanded place holder grid 37 with the mask data 38. The second embodiment may, at a glance, seem to omit the process of expanding the place holder grid 37. However, because the accuracy is multiplied by 2 view of the previous bit string) at the time of calculating the addition data, both the expanding process and the substituting process are actually performed together in the second embodiment.

According to the above-described processes, there can be obtained a relationship in which the bit value of a connection target (i.e. a bit string sx or sy to which addition data is connected) changes in terms of blocks whose addition data does not change whereas the bit value of a connection target does not change in terms of blocks whose addition data changes. Hence, a composite bit string s can be determined according to a tendency in which a bit value changes in every single block. This relationship can be understood by referring to, for example, FIG. 14. Although the content of the blocks indicated with arrow (a) in the mask data 38#4 does not change, the content of the blocks indicated with arrow (a) in the place holder grid 37#4! changes. On the other hand, although the content of the blocks indicated with arrow (b) in the mask data 38#4 changes, the content of the blocks indicated with arrow (b) in the place holder grid 37#4! does not change. The addition data having a property similar to the mask data 38 and the bit string of the connection target having a property similar to the place holder grid 37 establish a relationship similar to the above-described relationship. Accordingly, the composite bit string s is determined according to a tendency in which a bit value changes in every single block.

By generating and compositing the bit strings sx, sy, a composite bit string s can be obtained (Step S204 of FIG. 18, Step S304 of FIG. 20). The obtained composite bit string s itself may be output as a code without being converted. Alternatively, the obtained composite bit string s may be converted into text data and output in the form of text data. Regardless of whether the composite bit string s is converted, a code satisfying uniqueness and distance retention can be output with the composite bit string s. Therefore, similar to the first embodiment, distance can easily be calculated by using a code output according to coordinate data of two points.

Although the composite bit string s is calculated with the above-described algorithm, the composite bit string s may also be output by generating the composite bit string map 36 beforehand or storing the composite bit string map 36 in, for example, an auxiliary storage device 16 beforehand and applying the composite bit string map 36 to coordinate data.

In addition, the process of generating the composite bit string map 36 of the above-described first embodiment is performed not only by geometrically dividing a region. For example, the process of generating the composite bit string map 36 may be performed exhaustively on all coordinate data within a region. In this case, the process results are stored in a storage device.

As described above, in a case where a map that does not satisfy distance retention (e.g., geohashing) is used, block distance cannot be immediately derived even if codes of two points or composite bit strings of two points are provided.

On the other hand, because a composite bit string satisfying uniqueness and distance retention is generated by the coordinate coding apparatus 2 according to the above-described embodiment of the present invention, the distance between two points can easily calculated by using the composite bit string.

Operation Example

Next, an operation example of the coordinate coding apparatus according to an embodiment of the present invention is described. FIG. 23 is a schematic diagram illustrating how a composite bit string s is determined based on the composite bit string map 36. In this example illustrated in FIG. 23, the coordinates of a block positioned at the top left corner of the region Ap are arbitrarily set to, for example, (0,0), and the coordinates of a bottom right corner of the region Ap are arbitrarily set to, for example, (500, 500). In this operation, a composite bit string s corresponding to coordinate data (350, 150) is obtained where coordinate accuracy N is 3. In this example, a region that satisfies uniqueness in the composite bit string map 36 is expressed as x: [−300, 500], y: [−300, 500]. Accordingly, the outer rim of the composite bit string map 36 is expressed as Lx*=−300, Hx*=500, Ly*=−300, and Hy*=500.

First, an even bit string sx is generated from x=350 by performing the operation of FIG. 21. In Step S400, the initial bit length n of the composite bit string s is defined as 2 in Step S400. Because x coordinate "350" is included in the section [100, 500], the initial value of the bit string sx becomes 1 (Step S402-S406).

Then, after determining that n=2<$2^3$ in Step S408, the operation proceeds to Step S410. Then, in Step S410, n is multiplied by 2 and becomes 4. In Step S412, "i" is defined as 4 because x coordinate "350" is the fourth one from the left in a case where section [−300, 500] is equally divided into 4 section groups. As a result, addition data "$b_{e,4}$" becomes "1" as illustrated with the following Formula (3) (1 becomes 0 by performing a 1 bit logic shift on 1, and its inverted value is 1).

$$b_{e,4} = \sim\left\{(2^{4/4}-1) << \text{floor}\left(\frac{4}{2} - \frac{4}{4}\right)\right\} \quad \text{[Formula (3)]}$$
$$= \sim(1 << 1)$$
$$= 1$$

Then, in Step S416, the addition data "$b_{e,4}$=1" is connected to the bit string sx=1, to thereby generate a new bit string sx=11. Then, the operation returns to Step S408.

Then, after determining that n=4<$2^3$ in Step S408, the operation proceeds to Step S410. Then, in Step S410, n is multiplied by 2 and becomes 8. In Step S412, "i" is defined as 7 because x coordinate "350" is the seventh one from the left in a case where section [−300, 500] is equally divided into 8 section groups. As a result, addition data "$b_{e,7}$" becomes "01" as illustrated with the following Formula (4) (3 (i.e. 11) becomes 10 by performing a 1 bit logic shift on 11, and its inverted value is 01).

$$b_{e,7} = \sim\left\{(2^{8/4}-1) << \text{floor}\left(\frac{7}{2} - \frac{8}{4}\right)\right\} \quad \text{[Formula (4)]}$$
$$= \sim(3 << 1)$$
$$= 01$$

Then, in Step S416, the addition data "$b_{e,7}$=01" is connected to the bit string sx=11, to thereby generate a new bit string sx=1101. Then, the operation returns to Step S408.

In Step S408, the operation proceeds to Step S418 because it is determined that n=8≥$2^3$. In Step S418, the new bit string sx=1101 is output.

Next, an odd bit string sy is generated from y=150 by performing the operation of FIG. 22. In Step S500, the initial bit length n of the composite bit string s is defined as 2 in Step S500. Because y coordinate "150" is included in the section [100, 500], the initial value of the bit string sy becomes 0 (Step S502-S506) (see region (1) (Ap) of FIG. 23).

Then, after determining that n=2<$2^3$ in Step S508, the operation proceeds to Step S510. Then, in Step S510, n is multiplied by 2 and becomes 4. In Step S512, "i" is defined as 3 because y coordinate "150" is the third one from the left in a case where section [−300, 500] is equally divided into 4 section groups. As a result, addition data "$b_{o,3}$" becomes "0" as illustrated with the following Formula (5) (see region (2) of FIG. 23).

$$b_{o,3} = \sim\left\{(2^{4/4}-1) << \text{floor}\left(\frac{3}{2} - \frac{4}{4}\right)\right\} \quad \text{[Formula (5)]}$$
$$= \sim(1 << 0)$$
$$= 0$$

Then, in Step S516, the addition data "$b_{o,3}$=0" is connected to the bit string sy=10, to thereby generate a new bit string sy=10. Then, the operation returns to Step S508.

Then, after determining that n=4<$2^3$ in Step S508, the operation proceeds to Step S510. Then, in Step S510, n is multiplied by 2 and becomes 8. In Step S512, "i" is defined as 5 because y coordinate "150" is the fifth one from the left in a case where section [−300, 500] is equally divided into 8 section groups. As a result, addition data "$b_{o,5}$" becomes "00" as illustrated with the following Formula (6) (see region (3) of FIG. 23).

$$b_{o,5} = \sim\left\{(2^{8/4}-1) << \text{floor}\left(\frac{5}{2} - \frac{8}{4}\right)\right\} \quad \text{[Formula (6)]}$$
$$= \sim(3 << 0)$$
$$= 00$$

Then, in Step S516, the addition data "$b_{o,5}$=00" is connected to the bit string sy=11, to thereby generate a new bit string sy=1000. Then, the operation returns to Step S508.

In Step S508, the operation proceeds to Step S518 because it is determined that n=8≥$2^3$. In Step S518, the new bit string sy=1000 is output.

Accordingly, a composite bit string s=11100010 (the upper column being 1101 and the lower column being 1000 in a case where the composite bit string s is indicated in two columns) corresponding to the coordinate data (350, 150) is obtained by alternately reading out and compositing 1 bit from the top bit of the bit string sx and the top bit of the bit string sy.

By performing the same processes on coordinate data (50, 50), a composite bit string s=00000000 (the upper column being 0000 and the lower column being 0000 in a case where the composite bit string s is indicated with two columns) can be obtained. Further, by performing the same processes on coordinate data (250, 250), a composite bit string s=11000011 (the upper column being 1001 and the lower column being 1001 in a case where the composite bit string s is indicated with two columns) can be obtained.

In the following, the coordinate data (350, 150) is assumed as coordinate A, the coordinate data (50, 50) is assumed as coordinate B, and the coordinate data (250, 250) is assumed as coordinate C. Because the coordinate accuracy N of the above-described composite bit strings s is "3", points that are separated "100" or more have a distinguishable accuracy. It is to be noted that "100" is obtained by dividing an outer rim {500−(−300)} of the composite bit string map 36 with $2^3$.

The block distance BD between the coordinate A and the coordinate B is 4 blocks according to FIG. 23 (obtained by multiplying 100 by 4 in a case where the distance of 1 block is 100). The block distance BD can also be calculated as an absolute sum of the difference between the coordinates A and B (|350−50|+|150−50|=400; 4 in units of blocks). Meanwhile, the Hamming distance (number of inverted bits) is 4 because the composite bit string SA corresponding to the coordinate A is 11100010 and the composite bit string SB corresponding to the coordinate B is 00000000.

Further, the block distance BD between the coordinate A and the coordinate C is 2 blocks according to FIG. 23 (obtained by multiplying 100 by 2 in a case where the distance of 1 block is 100). Further, the Hamming distance (number of inverted bits) is 2 because the composite bit string SA corresponding to the coordinate A is 11100010 and the composite bit string SC corresponding to the coordinate B is 11000011.

Accordingly, consistency (retention) between the block distance BD and the Hamming distance can be attained by the processes of the coordinate coding apparatus 2 according to the above-described embodiment of the present invention.

Hence, with the coordinate coding apparatus 2 according to the above-described embodiment of the present invention, an input coordinate data can be converted and output as a code that satisfies uniqueness and distance consistency. Therefore, a process such as deriving a distance from a code can be promptly and easily.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Figure 24:
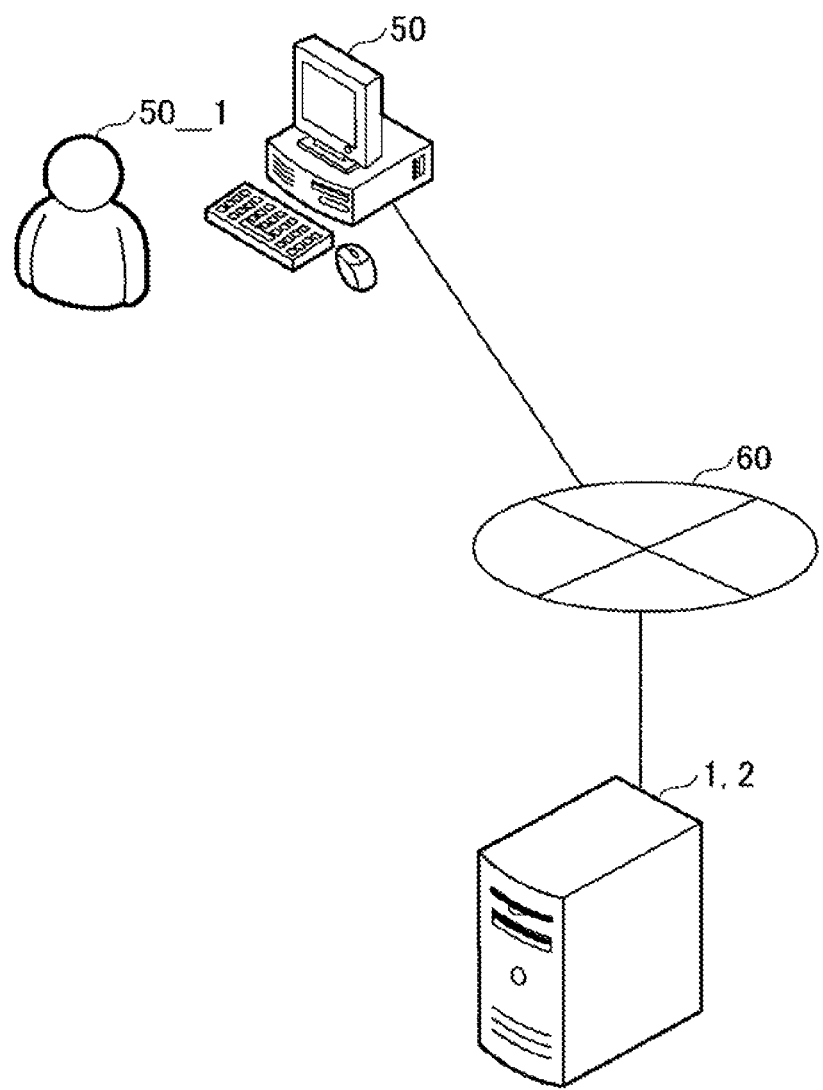
FIG. 24 is a schematic diagram illustrating an example to which the distance calculation apparatus of the first embodiment and the coordinate coding apparatus of the second embodiment are applied.

For example, from an aspect of hardware, the distance calculation apparatus 1 and the coordinate coding apparatus 2 are not limited to an embodiment in which the distance calculation apparatus 1 or the coordinate coding apparatus 2 alone performs all of the processes from input to output. For example, the distance calculation apparatus 1 or the coordinate coding apparatus 2 may be a server apparatus which performs a portion of the above-described processes. FIG. 24 is a schematic diagram illustrating an example to which the distance calculation apparatus 1 of the first embodiment and the coordinate coding apparatus 2 of the second embodiment are applied. In this example, coordinate data that is input to an input device 50_1 of a client computer 50 is transmitted to the coordinate coding apparatus 2, and a code corresponding to the coordinate data is returned from the coordinate coding apparatus 2 to the client computer 50. Alternatively, a code that is input to the input device 50_1 of the client computer 50 is transmitted to the distance calculation apparatus 1, and a distance corresponding to the code is returned from the distance calculation apparatus 1 to the client computer 50.

What is claimed is:

1. A coordinate coding apparatus comprising:
   a memory; and
   a processor operatively coupled to the memory and configured to implement
   a first unit that divides a target process region into blocks each of which having a predetermined bit length and generates mask data having the predetermined bit length corresponding to input coordinate data indicating the blocks of the target process region;
   a second unit that stores storage data including the input coordinate data and having the predetermined bit length;
   a third unit that generates composite bit string data that is twice the length of the predetermined bit length by connecting the mask data to the storage data, and stores the composite bit string data in the second unit; and
   a control unit that repeats an operation of designating the bit length of the composite bit string data stored by the third unit as the predetermined bit length, instructing the first unit to generate the mask, and instructing the third unit to generate and store the composite bit string data;
   wherein the number of different bits between a bit string of a location corresponding to the input coordinate data and a bit string of a reference location generated by the first unit increases as a distance between the location corresponding to the input coordinate data and the reference location increases.

2. The coordinate coding apparatus as claimed in claim 1, wherein the first unit is configured to generate the mask data to increase the number of different bits every other block.

3. The coordinate coding apparatus as claimed in claim 1, wherein the first unit is configured to generate the mask data by using a formula of:

$$\text{mask data} = \sim\{(2^{n/4}-1 << \text{floor}(k/2-n/4)\};$$

wherein "n" represents the predetermined bit length, "~" represents a NOT operator, "<<" represents a logic shift operator, "floor" is a function representing to round down, and "k" is a value indicating a block of the target process region to which the input coordinate data belongs.

4. A coordinate coding method comprising:
   causing a computer to execute processes including dividing a target process region into blocks each of which having a predetermined bit length;
   generating mask data having the predetermined bit length corresponding to input coordinate data indicating the blocks of the target process region with a first unit;
   storing storage data including the input coordinate data and having the predetermined bit length with a second unit;
   generating composite bit string data that is twice the length of the predetermined bit length by connecting the mask data to the storage data with a third unit;
   storing the composite bit string data with the third unit; and
   repeating an operation of designating a bit length of the composite bit string data stored by the third unit as the predetermined bit length, instructing the first unit to generate the mask data, and instructing the third unit to generate and store the composite bit string data;
   wherein the number of different bits between a bit string of a location corresponding to the input coordinate data and a bit string of a reference location generated by the first unit increases as a distance between the location corresponding to the input coordinate data and the reference location increases.

5. A non-transitory computer-readable recoding medium on which a program is recorded for causing a computer to execute a coordinate coding method, the coordinate coding method comprising:
   dividing a target process region into blocks each of which having a predetermined bit length;
   generating mask data having the predetermined bit length corresponding to input coordinate data indicating the blocks of the target process region with a first unit;
   storing storage data including the input coordinate data and having the predetermined bit length with a second unit;
   generating composite bit string data that is twice the length of the predetermined bit length by connecting the mask data to the storage data with a third unit;
   storing the composite bit string data with the third unit; and
   repeating an operation of designating a bit length of the composite bit string data stored by the third unit as the predetermined bit length, instructing the first unit to generate the mask data, and instructing the third unit to generate and store the composite bit string data;

wherein the number of different bits between a bit string of a location corresponding to the input coordinate data and a bit string of a reference location generated by the first unit increases as a distance between the location corresponding to the input coordinate data and the reference location increases.

6. A distance calculation apparatus comprising:
a memory; and
a processor operatively coupled to the memory and configured to implement
   a storage unit that stores map data including a geographical coordinate associated to a code satisfying distance retention;
   a data search unit that searches for the map data by using a plurality of input coordinate data and obtains a plurality of codes corresponding to the plural input coordinate data; and
   a distance calculation unit that compares the plural codes and calculates distances between the plural input coordinate data;
wherein in a case where a target process region is divided into blocks each of which being assigned with a composite bit string, the distance retention of the code is satisfied when a first distance between two blocks in the target process region matches a second distance between the two blocks in the target process region,
wherein the first distance indicates the number of inverted bits between the composite bit strings of the two blocks, and
wherein the second distance indicates how many blocks the two blocks are separated.

7. The coordinate coding apparatus as claimed in claim 6, wherein the distance retention is a property in which the first distance and the second distance match between any given two blocks in the target process region.

8. The coordinate coding apparatus as claimed in claim 6, wherein the distance retention is a property in which a Block distance and a Hamming distance match between any given two blocks in the target process region.

9. The distance calculation apparatus as claimed in claim 6, wherein each of the blocks of the target process region is assigned with a different composite bit string.

10. A distance calculation method comprising:
causing a computer to execute processes including
   searching for map data including a geographical coordinate associated to a code satisfying distance retention by using a plurality of input coordinate data,
   obtaining a plurality of codes corresponding to the plural input coordinate data,
   comparing the plural codes, and
   calculating distances between the plural input coordinate data;
wherein in a case where a target process region is divided into blocks each of which being assigned with a composite bit string, the distance retention of the code is satisfied when a first distance between two blocks in the target process region matches a second distance between the two blocks in the target process region,
wherein the first distance indicates the number of inverted bits between the composite bit strings of the two blocks, and
wherein the second distance indicates how many blocks the two blocks are separated.

11. The distance calculation method as claimed in claim 10, wherein each of the blocks of the target process region is assigned with a different composite bit string.

12. A non-transitory computer-readable recording medium on which a program is recorded for causing a computer to execute a distance calculation method, the distance calculation method including:
causing the computer to execute processes including
   searching for map data including a geographical coordinate associated to a code satisfying distance retention by using a plurality of input coordinate data,
   obtaining a plurality of codes corresponding to the plural input coordinate data,
   comparing the plural codes, and
   calculating distances between the plural input coordinate data;
wherein in a case where a target process region is divided into blocks each of which being assigned with a composite bit string, the distance retention of the code is satisfied when a first distance between two blocks in the target process region matches a second distance between the two blocks in the target process region,
wherein the first distance indicates the number of inverted bits between the composite bit strings of the two blocks, and
wherein the second distance indicates how many blocks the two blocks are separated.

13. The non-transitory computer-readable recording medium as claimed in claim 12, wherein each of the blocks of the target process region is assigned with a different composite bit string.

14. A code map generation apparatus comprising:
a processor configured to implement
   a first map data generation unit that generates a first map data of a target process location including first data to which blank data is connected, and expand the first map data;
   a second map data generation unit that generates a second map data of the target process location including second data that increases as a distance between a location corresponding to an input coordinate data indicating a coordinate in the target process location of the first map data and a reference location of the first map data increases; and
   a composite bit string map generating unit that repeats generation of a map satisfying distance retention by substituting the blank data of the first map data expanded by the first map generation unit with the second map data.

15. A code map generation method comprising:
causing a computer to execute processes including
   generating a first map data including first data to which blank data is connected, and expand the first map data by a first map generation unit;
   generating a second map data including second data that increases as a distance between a location corresponding to an input coordinate data of the first map data and a reference location of the first map data increases; and
   repeating generation of a map satisfying distance retention by substituting the blank data of the first map data expanded by the first map generation unit with the second map data.

16. A non-transitory computer-readable recording medium on which a program is recorded for causing a computer to execute a code map generation method, the code map generation method including:
    causing the computer to execute processes including
        generating a first map data including first data to which blank data is connected, and expand the first map data by a first map generation unit;
        generating a second map data including second data that increases as a distance between a location corresponding to an input coordinate data of the first map data and a reference location of the first map data increases; and
        repeating generation of a map satisfying distance retention by substituting the blank data of the first map data expanded by the first map generation unit with the second map data.

17. A coordinate coding apparatus comprising:
a storage unit that stores map data satisfying distance retention; and
a data search unit that searches for the map data by using input coordinate data and obtains a code corresponding to the input coordinate data;
wherein in a case where a target process region is divided into blocks each of which being assigned with a composite bit string, the distance retention of the code is satisfied when a first distance between two blocks in the target process region matches a second distance between the two blocks in the target process region,
wherein the first distance indicates the number of inverted bits between the composite bit strings of the two blocks, and
wherein the second distance indicates how many blocks the two blocks are separated.

18. The coordinate coding apparatus as claimed in claim 17, wherein each of the blocks of the target process region is assigned with a different composite bit string.

19. A distance calculation apparatus comprising:
a processor configured to implement
    an input unit into which coordinate data is input and
    a distance calculation unit that calculates a distance between the input coordinate data when a plurality of geographical coordinate data and codes satisfying distance retention are input;
wherein in a case where a target process region is divided into blocks each of which being assigned with a composite bit string, the distance retention of the code is satisfied when a first distance between two blocks in the target process region matches a second distance between the two blocks in the target process region,
wherein the first distance indicates the number of inverted bits between the composite bit strings of the two blocks, and
wherein the second distance indicates how many blocks the two blocks are separated.

20. The distance calculation apparatus as claimed in claim 19, wherein each of the blocks of the target process region is assigned with a different composite bit string.

* * * * *